US008355621B2

(12) United States Patent
Quan

(10) Patent No.: US 8,355,621 B2
(45) Date of Patent: Jan. 15, 2013

(54) CONTENT MANAGEMENT FOR A VIDEO SIGNAL

(75) Inventor: Ronald Quan, Cupertino, CA (US)

(73) Assignee: Rovi Solutions Corporation, Santa Clara, CA (US)

( * ) Notice: Subject to any disclaimer, the term of this patent is extended or adjusted under 35 U.S.C. 154(b) by 1898 days.

(21) Appl. No.: 11/259,520

(22) Filed: Oct. 25, 2005

(65) Prior Publication Data

US 2006/0093140 A1    May 4, 2006

Related U.S. Application Data

(60) Provisional application No. 60/623,297, filed on Oct. 28, 2004.

(51) Int. Cl.
*H04N 9/80* (2006.01)
(52) U.S. Cl. ......... 386/254; 386/239; 386/248; 386/252
(58) Field of Classification Search .................... 386/46, 386/52, 61, 71, 94, 239–260; 380/201, 203, 380/204
See application file for complete search history.

(56) References Cited

U.S. PATENT DOCUMENTS

| 4,022,972 | A | 5/1977 | Pires |
| 4,100,575 | A | 7/1978 | Morio et al. |
| 4,577,216 | A | 3/1986 | Ryan |
| 4,631,603 | A | 12/1986 | Ryan |
| 4,695,901 | A | 9/1987 | Ryan |
| 4,819,098 | A | 4/1989 | Ryan |
| 4,907,093 | A | 3/1990 | Ryan |
| 4,937,679 | A | 6/1990 | Ryan |

(Continued)

FOREIGN PATENT DOCUMENTS

CN    1127577 A    7/1996

(Continued)

OTHER PUBLICATIONS

First Chinese Office Action for Chinese Patent Application No. 200580037612 filed on Oct. 25, 2005, fifteen pages. (English Translation.).

(Continued)

*Primary Examiner* — Thai Tran
*Assistant Examiner* — Hung Dang
(74) *Attorney, Agent, or Firm* — Morrison & Foerster LLP

(57) ABSTRACT

A high definition television video content management and/or copy protection method and apparatus are achieved by modifying portions of one or more channels of an HDTV (high definition television) signal. These modifications are generally in the blanking intervals but can extend into the overscanned portions. In one version, the signal modification defines tags or trigger bits for a content control system. This modification may follow the HDTV tri-level sync (synchronization) pulses for example, and it may occur in at least one of the HDTV video channels. In another version, portions of the tri-level sync pulse are modified to cause a reference sensing circuit such an AGC system (in a receiving device such as a video recorder) to produce an erroneous output. Optionally, a signal may be added or inserted following the modified tri-level sync pulses. In another version, tri-level pseudo sync pulses are added in blanking or overscanned intervals. These tri-level pseudo sync pulses may be asymmetrical and may be followed by a signal. Further, any of the above modifications or signals or sync signals may be modulated (e.g., amplitude, position, pulse-width). Also these modifications may be provided to a generic television system.

53 Claims, 22 Drawing Sheets

U.S. PATENT DOCUMENTS

| | | | |
|---|---|---|---|
| 5,012,340 A | 4/1991 | Kirschenstein | |
| 5,138,659 A | 8/1992 | Kelkar et al. | |
| 5,157,510 A | 10/1992 | Quan et al. | |
| 5,194,965 A | 3/1993 | Quan et al. | |
| 5,315,448 A | 5/1994 | Ryan | |
| 5,394,470 A * | 2/1995 | Buynak et al. | 380/204 |
| 5,583,936 A | 12/1996 | Wonfor et al. | |
| 5,625,691 A | 4/1997 | Quan | |
| 5,633,927 A | 5/1997 | Ryan et al. | |
| 5,657,387 A | 8/1997 | Mogi et al. | |
| 5,748,733 A | 5/1998 | Quan | |
| 5,778,064 A | 7/1998 | Kori et al. | |
| 5,790,096 A | 8/1998 | Hill, Jr. | |
| 5,796,442 A | 8/1998 | Gove et al. | |
| 5,822,425 A | 10/1998 | Ezaki et al. | |
| 5,907,655 A | 5/1999 | Oguro | |
| 5,953,417 A | 9/1999 | Quan | |
| 6,058,191 A | 5/2000 | Quan | |
| 6,240,245 B1 | 5/2001 | Kato et al. | |
| 6,272,286 B1 | 8/2001 | Asada et al. | |
| 6,285,408 B1 | 9/2001 | Choi et al. | |
| 6,285,756 B1 * | 9/2001 | Fan | 379/430 |
| 6,317,883 B2 | 11/2001 | Marics | |
| 6,327,422 B1 | 12/2001 | Quan et al. | |
| 6,339,449 B1 | 1/2002 | Ikeda et al. | |
| 6,349,139 B1 | 2/2002 | Quan | |
| 6,381,747 B1 | 4/2002 | Wonfor et al. | |
| 6,404,974 B1 | 6/2002 | Franklin | |
| 6,421,497 B1 | 7/2002 | Quan | |
| 6,437,830 B1 | 8/2002 | Horlander | |
| 6,535,614 B1 * | 3/2003 | Kimura et al. | 382/100 |
| 6,539,548 B1 | 3/2003 | Hendricks et al. | |
| 6,542,609 B1 * | 4/2003 | Ryan et al. | 380/210 |
| 6,559,891 B1 | 5/2003 | Jackson | |
| 6,594,441 B1 * | 7/2003 | Holzgrafe | 386/260 |
| 6,701,062 B1 | 3/2004 | Talstra et al. | |
| 6,731,758 B1 | 5/2004 | Graunke et al. | |
| 6,792,538 B1 | 9/2004 | Kuroda et al. | |
| 6,826,352 B1 | 11/2004 | Quan | |
| 6,848,051 B2 | 1/2005 | Wachtfogei et al. | |
| 7,248,784 B1 | 7/2007 | Kori et al. | |
| 2002/0172366 A1 | 11/2002 | Peterka et al. | |
| 2003/0091335 A1 | 5/2003 | Quan | |
| 2003/0142959 A1 | 7/2003 | Qu | |
| 2003/0152372 A1 | 8/2003 | Shimizu et al. | |
| 2004/0047469 A1 | 3/2004 | Ryan et al. | |
| 2004/0240846 A1 | 12/2004 | Cookson et al. | |
| 2004/0247288 A1 | 12/2004 | Nam et al. | |
| 2005/0084102 A1 | 4/2005 | Hollar | |
| 2005/0111661 A1 | 5/2005 | Wijnen et al. | |
| 2006/0093139 A1 | 5/2006 | Quan | |
| 2006/0093326 A1 * | 5/2006 | Tan et al. | 386/94 |
| 2006/0251252 A1 | 11/2006 | Quan | |
| 2007/0192787 A1 | 8/2007 | Hong | |
| 2008/0151114 A1 | 6/2008 | Kotos | |
| 2008/0309816 A1 | 12/2008 | Quan et al. | |

FOREIGN PATENT DOCUMENTS

| | | | |
|---|---|---|---|
| CN | 1181156 A | 5/1998 | |
| CN | 1324543 A | 11/2001 | |
| CN | 1324543 B | 11/2001 | |
| CN | 1939055 A | 3/2007 | |
| CN | 1939055 B | 3/2007 | |
| EP | 0224929 A2 | 6/1987 | |
| EP | 0224929 A3 | 6/1987 | |
| EP | 0580367 A2 | 1/1994 | |
| EP | 0580367 A3 | 1/1994 | |
| EP | 0580367 B1 | 1/1994 | |
| EP | 0 735 752 B1 | 8/2001 | |
| EP | 1 711 009 A1 | 10/2006 | |
| JP | 2000-152196 A | 5/2000 | |
| JP | 2000-510297 | 8/2000 | |
| JP | 2002-010206 A | 1/2002 | |
| JP | 2002-524933 | 8/2002 | |
| JP | 2002-535890 A | 10/2002 | |
| TW | 501370 | 9/2002 | |
| TW | 512629 | 12/2002 | |
| TW | 548983 | 8/2003 | |
| WO | WO-97/42755 A1 | 11/1997 | |
| WO | WO-00/13413 A1 | 3/2000 | |
| WO | WO-00/42763 A2 | 7/2000 | |
| WO | WO-00/42763 A3 | 7/2000 | |
| WO | WO-01/17251 A1 | 3/2001 | |
| WO | WO-01/74068 A1 | 10/2001 | |
| WO | WO-02/062054 A2 | 8/2002 | |

OTHER PUBLICATIONS

International Search Report mailed on Mar. 20, 2006 for PCT Application No. PCT/US2005/038711 filed on Oct. 25, 2005, 5 pages.

European Office Action mailed on Jun. 4, 2009, for EP Application No. 05 823 359.4 filed on Aug. 29, 2007, four pages.

Eitzmann, G. (Jun. 15, 1998). "Chapter 3. Building Blocks of a Video Format," located at http://techpubs.sgi.com/library/dynaweb_docs/0640/SGI_Developer/books/VFC_PG/sgi_ht . . . , last visited Jul. 6, 2004, 13 pages.

Gray, Peter. (Mar. 16, 2003). "Tri-level Synch Issues on the Set," located at http://jkor.com/peter/trilevel.html, last visited on Jul. 6, 2004, 11 pages.

HDTV.Net. (Date Unknown). "Local High Definition Information," located at http://www/hdtv.net/, last visited on Jul. 20, 2004, 1 page.

National Broadcast Corporation. (Date Unknown). "NBC & High Definition Television," located at http://www.nbc.com/nbc/footer/HDTV.shtml, last visited on Jul. 20, 2004, 2 pages.

Texas Instruments Incorporated. (Date Unknown). "TI Introduces First HDTV Compliant Digital-to-Analog Converters; Automatic Tri-level Sync Pulse Generation Eases Design and Brings HDTV Products to Market Faster," located at http://www.prnewswire.com/cgi-bin/stories.pl?ACCT=104&STORY=/www/story/03-29-19 . . . , last visited on Jul. 6, 2004, 3 pages.

Taiwan Search Report mailed Jul. 29, 2007, for Taiwan Patent Application 094138020 filed Oct. 28, 2005, 2 pages.

Japanese Office Action mailed on Feb. 22, 2011, for Japanese Patent Application No. 2007-539093, filed on Oct. 25, 2005, three pages. (English Translation).

Australian Examination Report mailed on Mar. 7, 2011, for Australian Application No. 2008266308, filed on Jun. 5, 2008, two pages.

Canadian Office Action mailed on Apr. 5, 2011, for Canadian Application No. 2,585,732, filed on Jun. 5, 2008, two pages.

First Chinese Office Action mailed on Dec. 31, 2010, for Chinese Application No. 200880102764.4, filed on Jun. 5, 2008, eleven pages. (English Translation.).

Second Chinese Office Action mailed on Jun. 5, 2009, for Chinese Patent Application No. 200580037361.2 filed on Oct. 25, 2005, seven pages. (English Translation).

Third Chinese Office Action mailed on Dec. 11, 2009, for Chinese Patent Application No. 200580037361.2 filed on Oct. 25, 2005, sixteen pages. (English Translation).

Fourth Chinese Office Action mailed May 5, 2010, for Chinese Patent Application No. 2005800373361.2 filed on Oct. 25, 2005, eight pages. (English Translation).

International Preliminary Report on Patentability mailed on May 7, 2007, for PCT Application No. PCT/US2005/038711, filed on Oct. 25, 2005, five pages.

International Preliminary Report on Patentability mailed on Dec. 30, 2009, for PCT Application No. PCT/US2008/065861, filed on Jun. 5, 2008, eight pages.

International Search Report mailed on Nov. 17, 2008, for PCT Application No. PCT/US2008/065861, filed on Jun. 5, 2008, six pages.

U.S. Appl. No. 60/934,723, filed Jun. 15, 2007, filed for Quan et al.

Written Opinion of the International Searching Authority mailed on Nov. 17, 2008, for PCT Application No. PCT/US2008/065861, filed on Jun. 5, 2008, eight pages.

Written Opinion of the International Search Authority mailed on Mar. 20, 2006 for PCT/US2005/038711, filed on Oct. 25, 2005, four pages.

Written Opinion mailed on Jul. 28, 2010, for Singapore Application No. 200908304-9, filed on Jun. 5, 2008, five pages.

Japanese Office Action mailed on Mar. 13, 2012, for Japanese Patent Application No. 2007-539093, filed on Oct. 25, 2005, five pages. (English Translation).

* cited by examiner

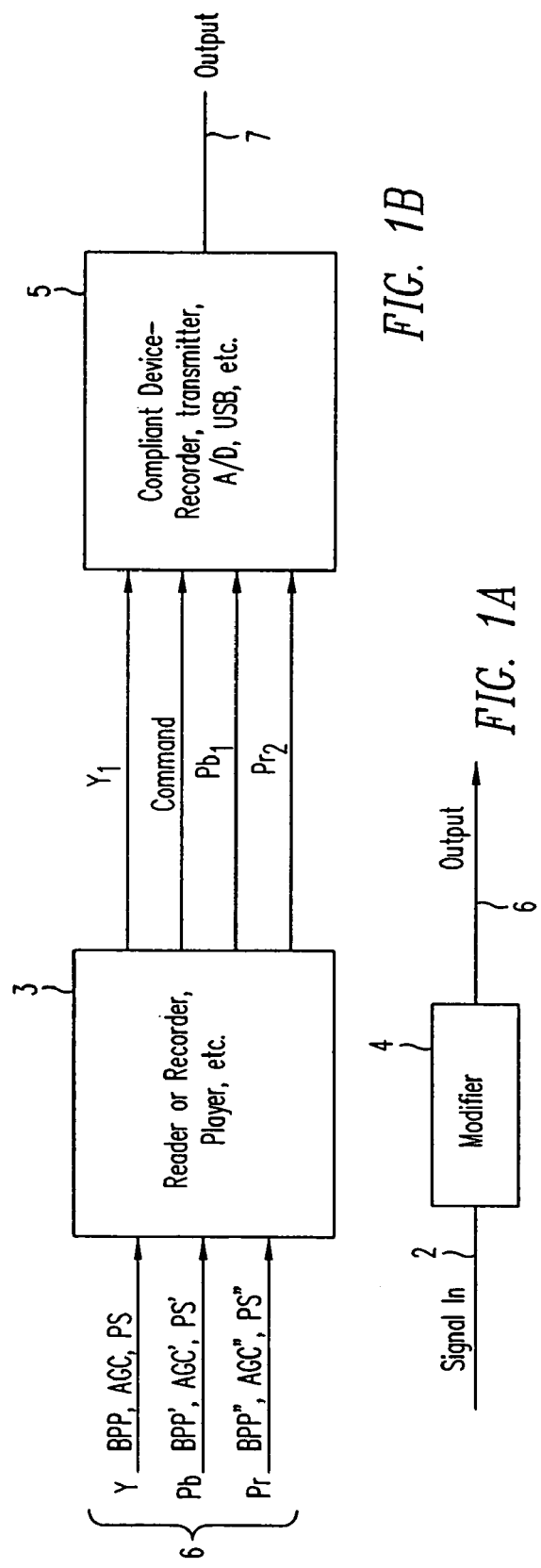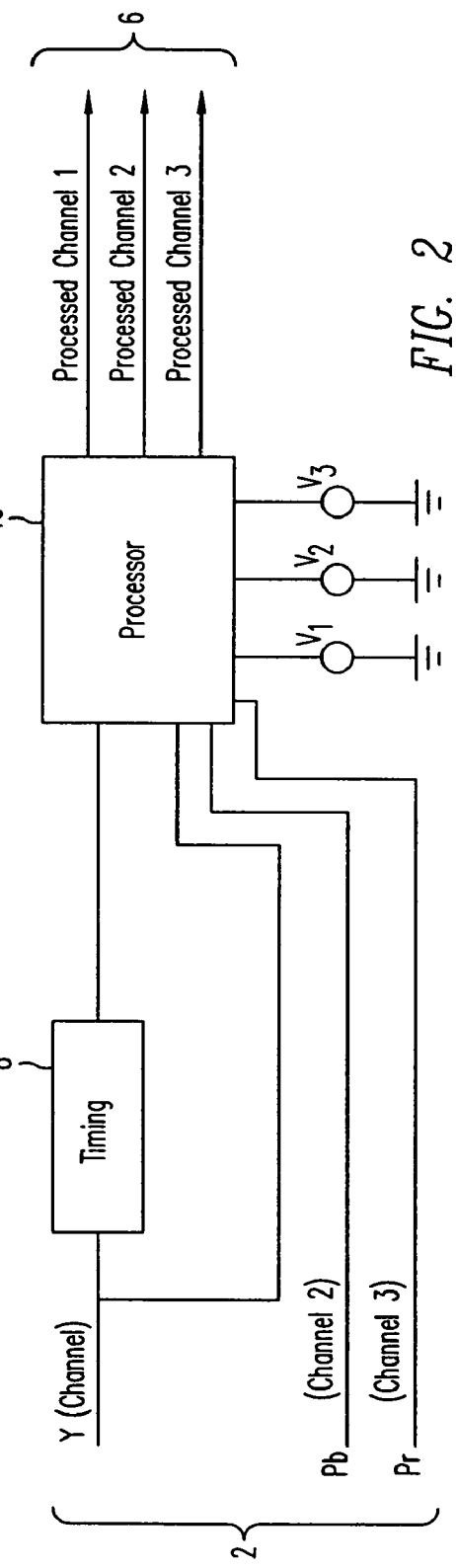

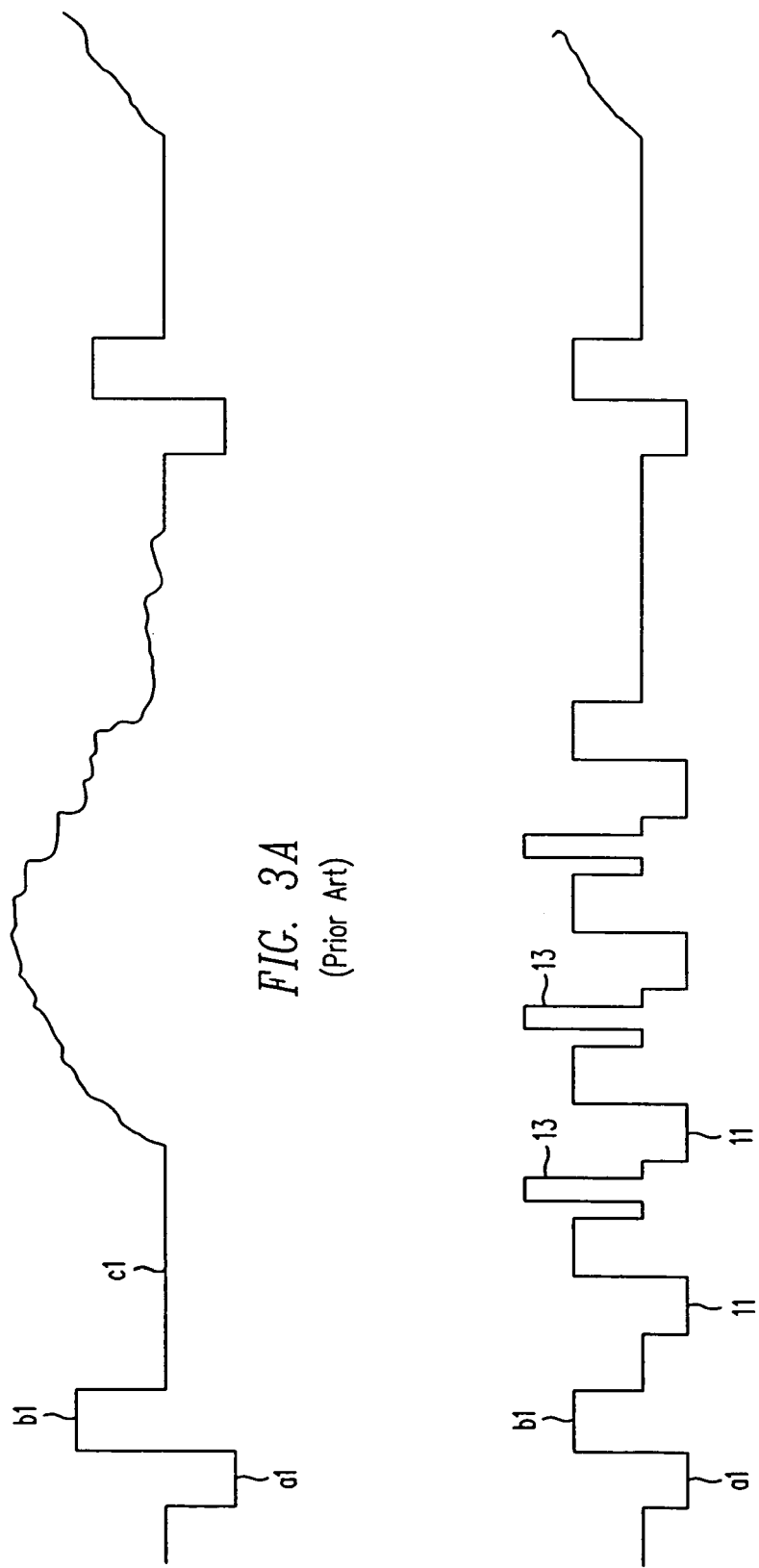

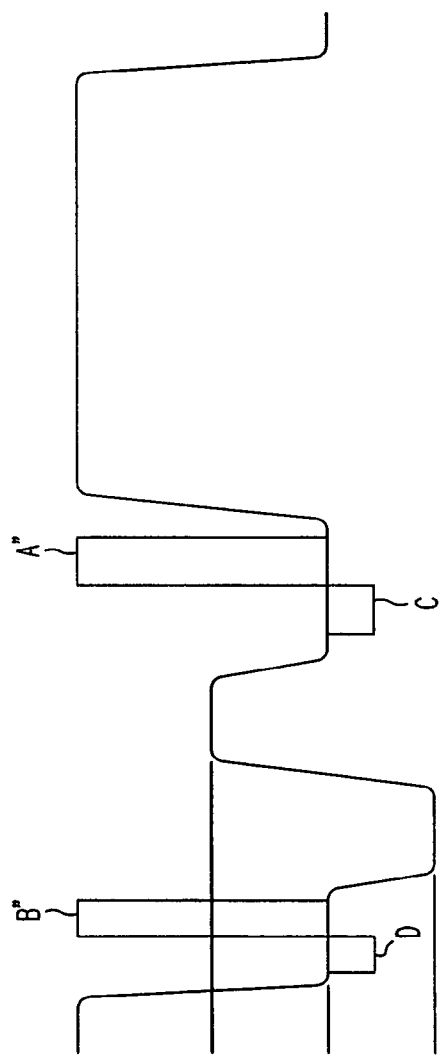
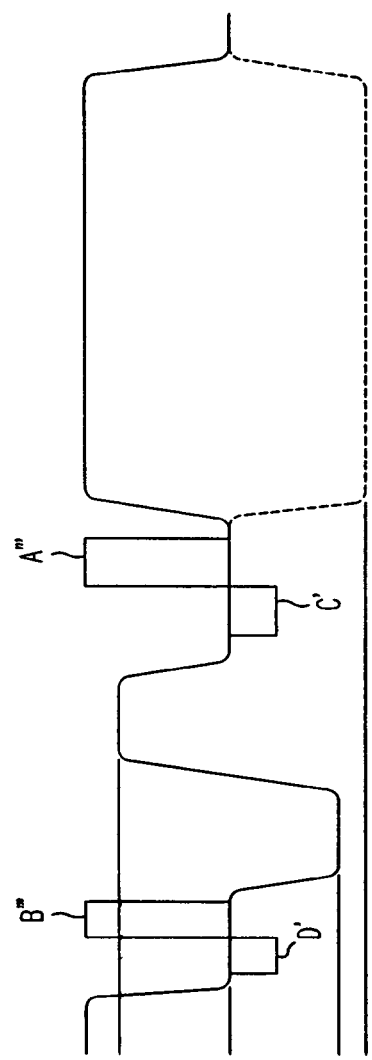
FIG. 5A
FIG. 5B

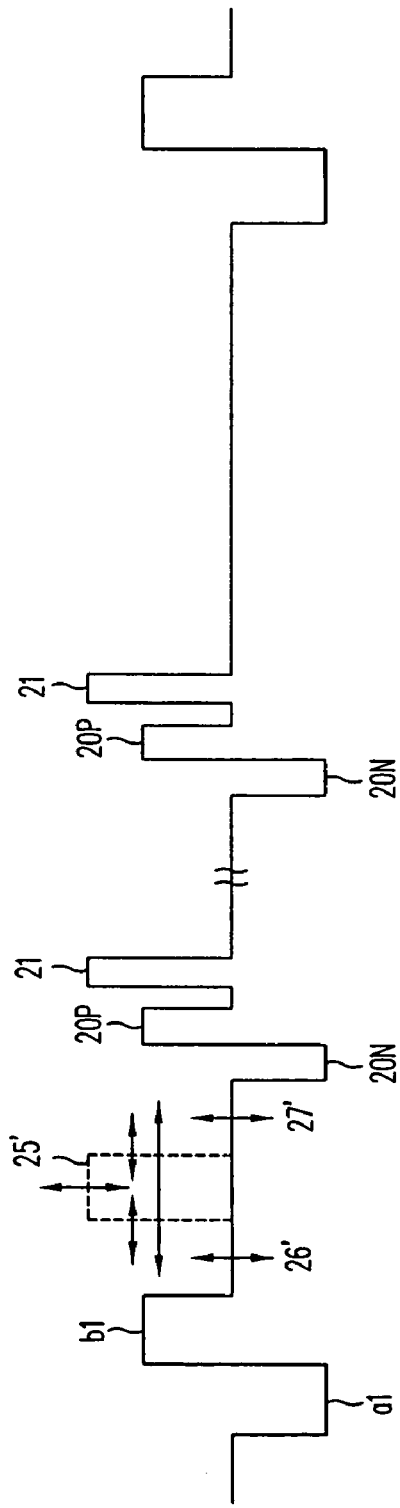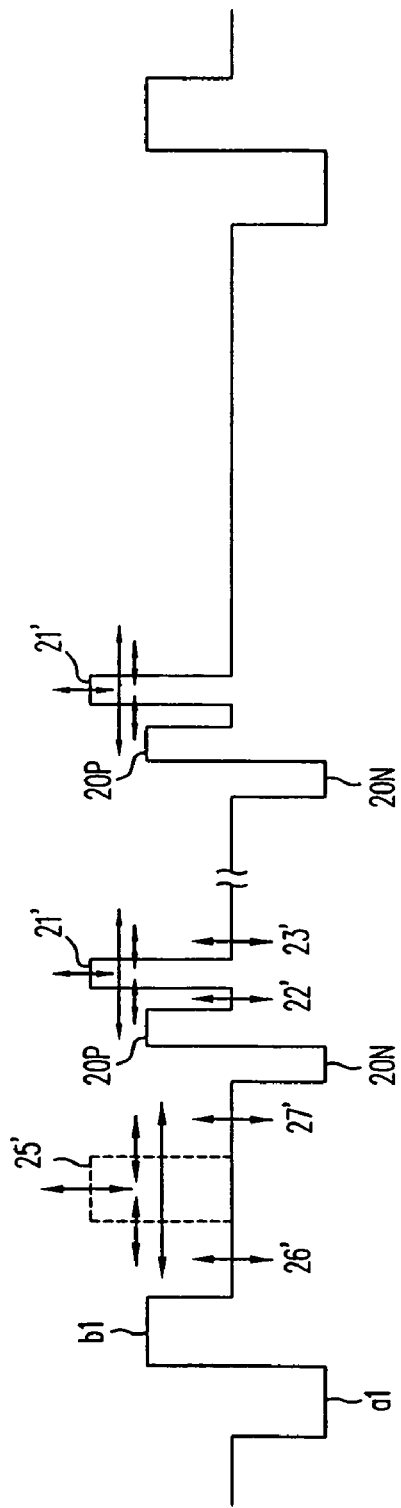

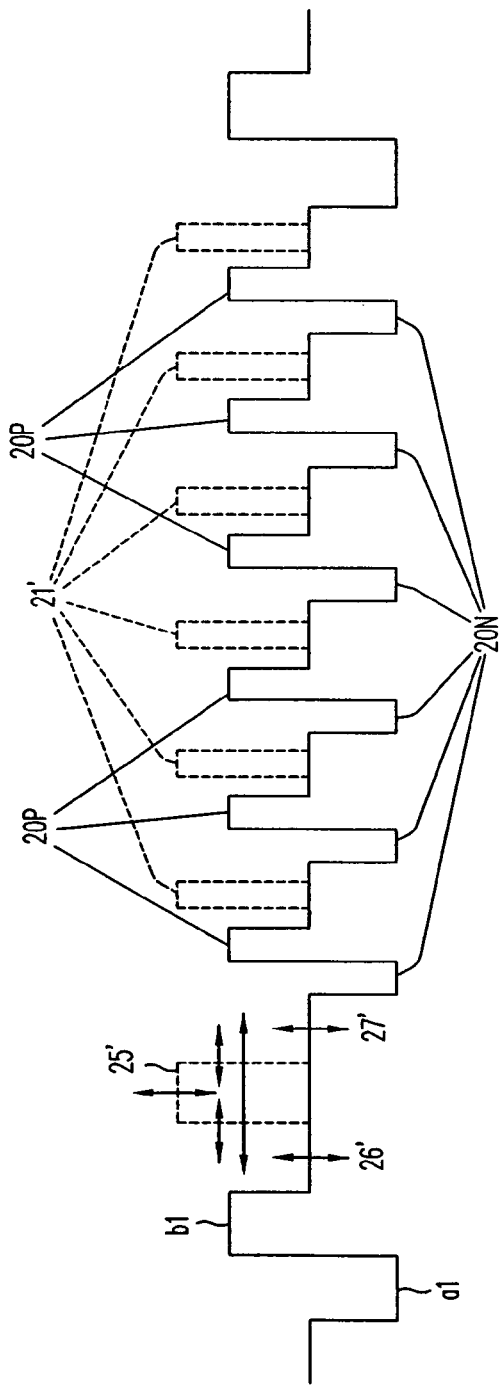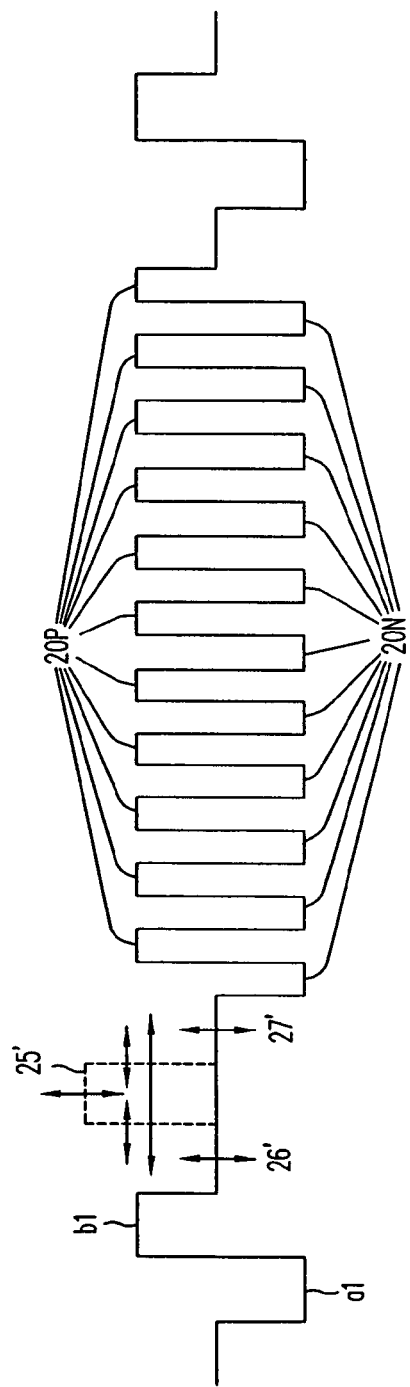

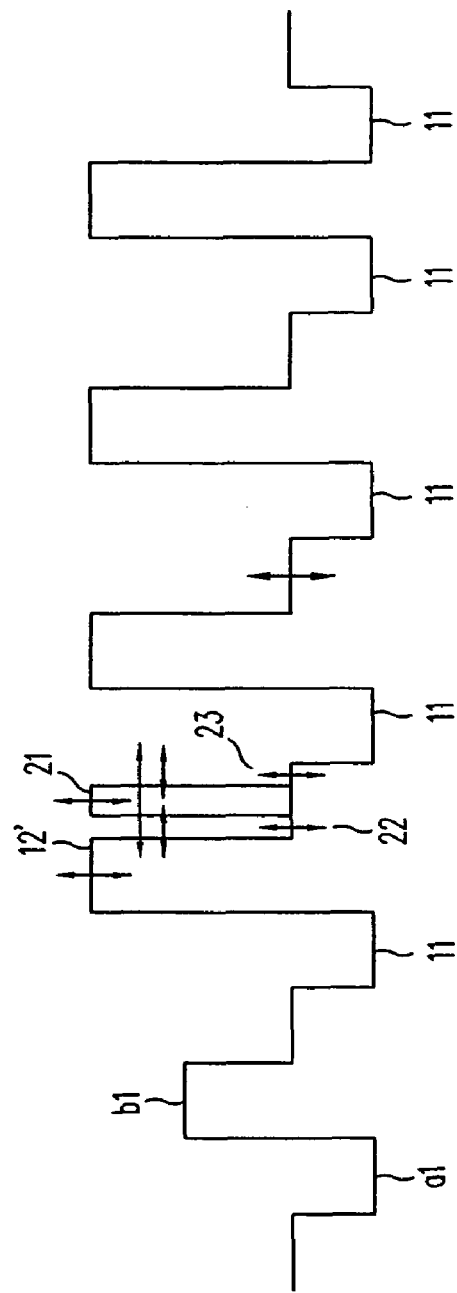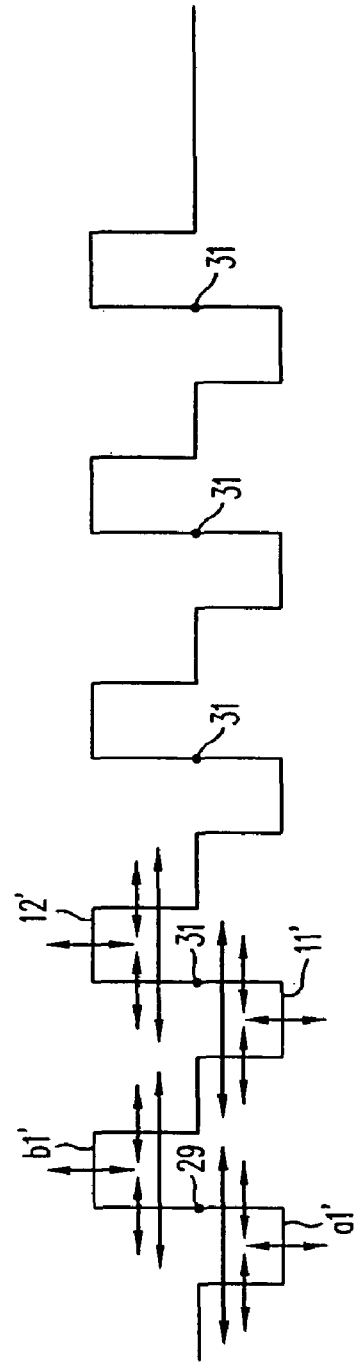

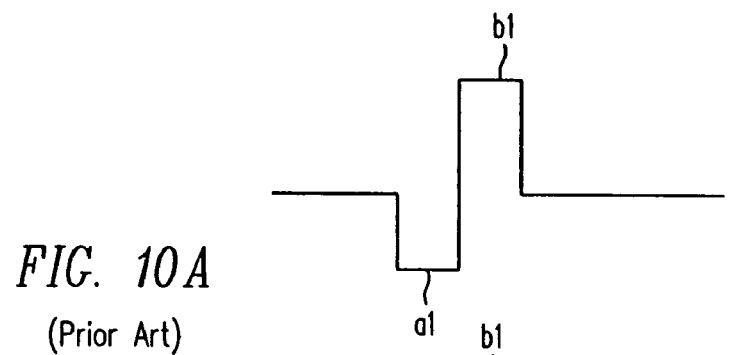
FIG. 10A
(Prior Art)
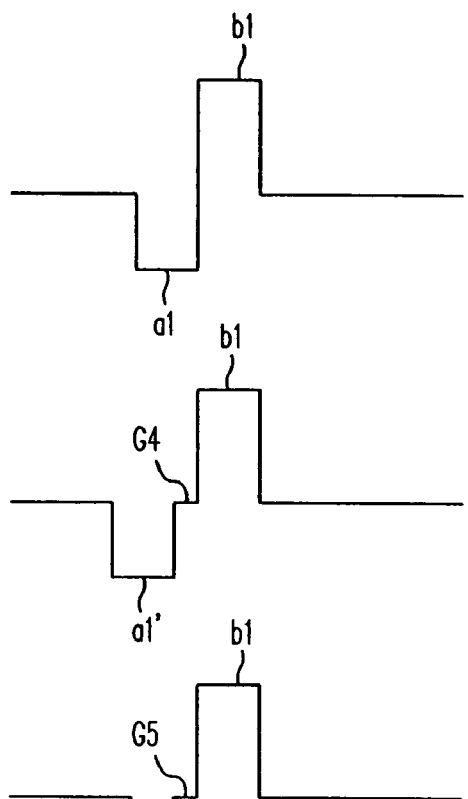
FIG. 10B
FIG. 10C
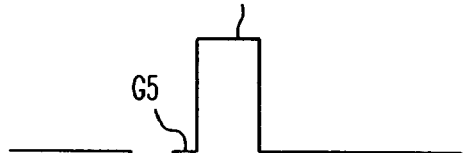
FIG. 10D
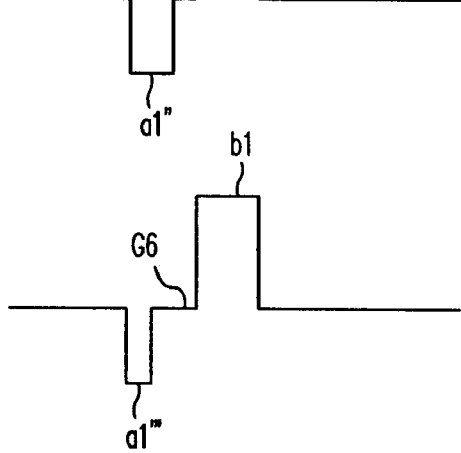
FIG. 13A
(Prior Art)
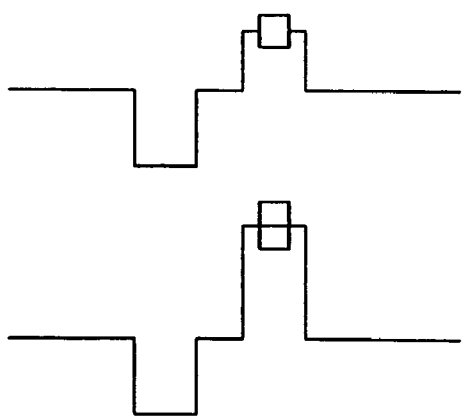
FIG. 13B

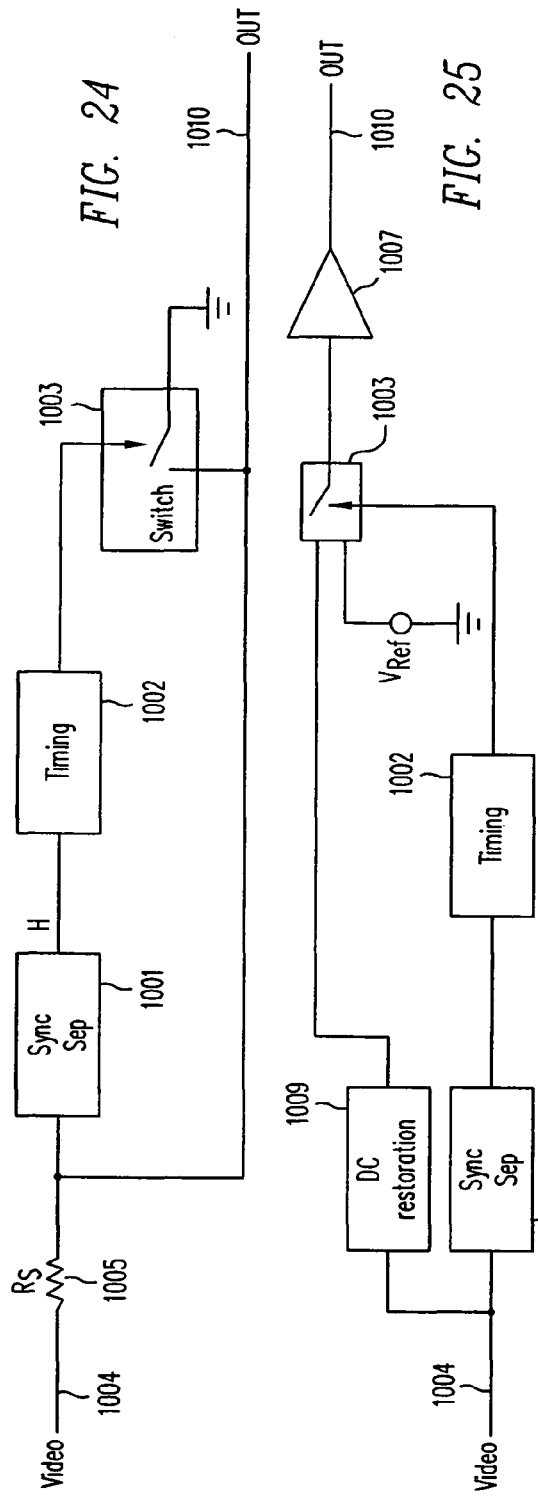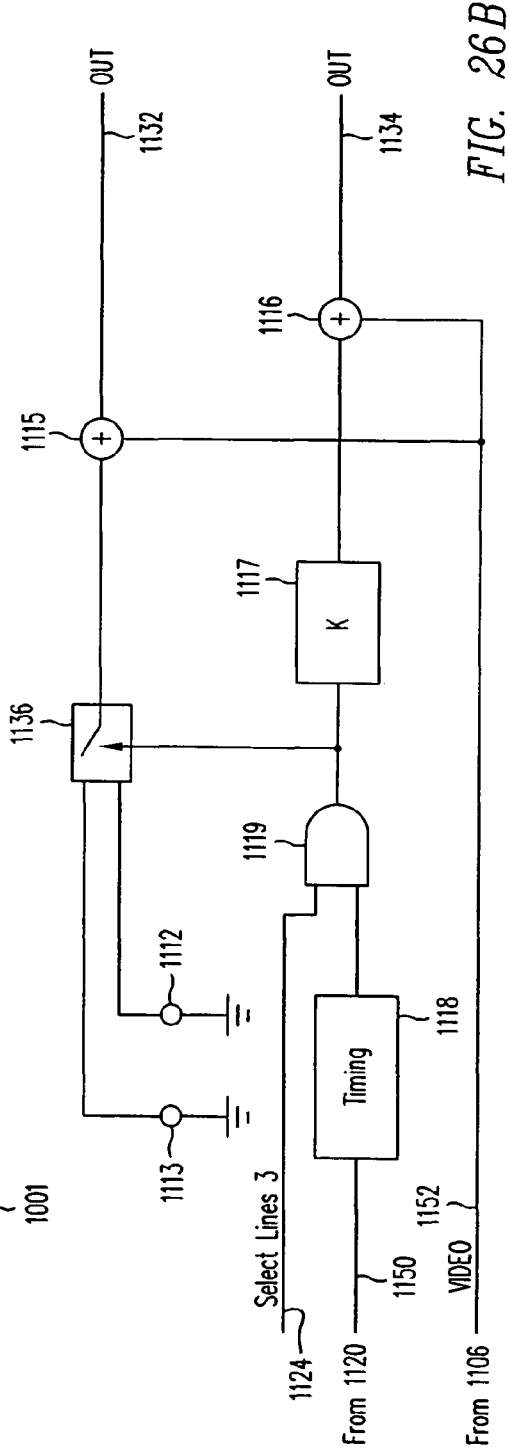

CONTENT MANAGEMENT FOR A VIDEO SIGNAL

CROSS-REFERENCE TO RELATED APPLICATIONS

This application claims priority to U.S. provisional application 60/623,297 filed Oct. 28, 2004.

FIELD OF THE INVENTION

This disclosure relates to video and more specifically to high definition television and more specifically to content management for high definition television, including copy control.

BACKGROUND

High definition television (HDTV) is now being introduced commercially in the U.S. Many U.S. television stations broadcast high definition television programs, and HDTV receiving equipment is available to the consumer. HDTV is a type of digital television (DTV). This means that the signals are transmitted generally in digital format, requiring special receivers. Two HDTV formats, approved in the United States, referred to as 1080i and 720p. The 1080i refers to a television picture with 1,080 video scan lines each with 1,920 pixels horizontally. The i refers to interlace scanning as used in traditional analog (NTSC, PAL, SEC AM) television which alternates sending odd lines and even lines in each frame to form a field. The 720p format provides a pictures with 720 vertical lines each with 1,280 pixels horizontally. The p refers to progressive scanning as used in computer displays. HDTV is replacing standard analog (NTSC, in the U.S.) television. HDTV is also being introduced outside the United States although similar to the case with analog television, somewhat different HDTV formats are being adapted by different countries and groups of countries, e.g., using different frame rates. Digital TV here refers to particular television formats and is not the same as so-called digital cable television. Digital TV (in this sense, actually digital broadcast television) actually defines (in the U.S.) eighteen different formats for broadcast television in a digital format. HDTV is six of those eighteen formats. The U.S. Federal Communications Commission (FCC) has ordered that by May 2006 all U.S. broadcasters will broadcast digital television signals in place of analog television signals.

As well known, in analog (e.g. NTSC) television, each video (horizontal) scan line includes a horizontal blanking interval including what is called a horizontal synchronization (sync) pulse. In between the horizontal blanking intervals there occurs what is called the active video. The end of each field of video also includes a vertical blanking interval. The blanking intervals are used to provide timing signals for the picture and operation of the receiver. The well known horizontal synchronization pulse in analog television includes what is called a front porch immediately preceding the horizontal sync pulse and a back porch immediately following the horizontal sync pulse. In analog television such as NTSC, PAL, and SECAM television the horizontal back porch also contains the color burst which is a color timing reference signal.

The vertical blanking regions are considerably longer than the horizontal blanking intervals in analog television and extend over, in terms of duration, the equivalent of a number of horizontal scan lines. The vertical blanking interval includes a relatively long vertical synchronization pulse followed by a number of so called equalizing pulses. In analog television, the horizontal sync pulse includes only two levels, one of which corresponds to a zero amplitude pulse or a blanking level and the other which is a lower amplitude pulse which is at sync tip level. However, for HDTV there has been defined an additional third level of the sync pulse, thus providing what is called a tri-level horizontal sync pulse. This includes initially a low negative going pulse (e.g. a sync tip level), followed immediately by a high positive going pulse, which crosses a blanking level. Thus the three levels provided are low, high and blanking level. The positive going pulse in a tri-level sync pulse is higher than the blanking level. Hence the use of tri-level sync pulses is conventional in HDTV as defined in the United States and also as used in other countries. Note that the HDTV typically includes three channels and hence is a type of composite video. These channels, for example, are referred to as Y (luma), Pb and Pr (chroma) which are the chroma channels. The Y (luma) channel is also sometimes referred to as the green channel with Pb sometimes referred to as a blue channel and Pr as a red channel. Of course other types of multiple channel video systems can be used.

Note that while the signal transmission in HDTV is digital, actually a significant portion of the signal processing takes place effectively in the analog domain and hence it is conventional to draw waveforms of the video signal for HDTV which look essentially the same as the analog type waveforms drawn to represent analog television signals. That convention is followed here.

One exemplary tri-level sync pulse used in HDTV has the blanking level at zero volts, the negative going portion at −0.3 volts and the positive going portion at +0.3 volts, followed by a back porch region and then followed by the active video portion. Just as in analog television, this tri-level horizontal sync pulse is repeated every scan line to create an entire high definition video frame. Synchronization and loss of synchronization otherwise may operate somewhat differently in high HDTV than in analog television. For analog television, loss of synchronization causes the image to roll and distort on the screen as the TV set tries to relock back into sync. However, high definition television receivers, being essentially digital devices, may have a different operation. On the screen, when sync is lost, in one example, there is likely to be displayed a green flash in the image or a series of green frames for ongoing loss of synchronization. In another example, a loss of sync in an HDTV signal may cause the display to blank out.

Also well known in the field of analog video and television is what is generally referred to as content management, an aspect of which is copy protection. Examples of copy protection are disclosed in Ryan U.S. Pat. No. 4,631,603 and Ryan U.S. Pat. No. 4,577,216 both incorporated herein by reference in their entireties. Generally these describe methods and apparatus for processing a video signal to inhibit making of acceptable video recordings therefrom. It is also known to defeat these copy protection processes, see for instance Ryan U.S. Pat. No. 4,695,901 also incorporated by reference herein in its entirety. Another method of inhibiting making of acceptable video recordings is disclosed in Ryan U.S. Pat. No. 4,819,098 using clustering modifications to a video signal. Generally these copy protection techniques and apparatus modify an otherwise standard video signal in such a way that the resulting video signal, while readily displayed on a display device (a TV set or monitor) when provided to a video recorder such as a video tape recorder, produce distortion on any copies made therefrom by the recorder, thus resulting in an unacceptable copy in terms of later viewing. Copy protection in this context includes a technical means for making copies unviewable or less viewable on a conventional display device when using a conventional recording device to make the copies.

The broader field of content management also includes so-called compliant devices which are designed so that they include circuitry that detects for certain signals or the absence of same in a video signal being received. The presence (or absence) of the particular signal acts as a command to the receiving device thereby to enable or inhibit recording. In some cases, this involves generational copy management whereby a first generation copy may be made, but subsequent generation copies are prevented. See for instance Talstra et al. U.S. Pat. No. 6,701,062 disclosing such a system for video as provided on a media such as a DVD. Such copy management is applicable to a digital video signal of the type used on video media such as DVDs. These more sophisticated copy control systems typically require dedicated circuitry and/or software in the receiving device to detect and interpret the special data provided in the video signal for purposes of content management.

However, none of these methods are directed to HDTV or, for that matter, to digital broadcast television generally. In this context, of course, broadcast includes not only conventional broadcast, but also cable, satellite broadcast, etc. None of these methods address the particular configuration of HDTV video signals or the differences of HDTV from, for instance, analog television signals.

SUMMARY

In one embodiment, tag signals or trigger bits are added or inserted following at least a tri-level sync pulse in HDTV video for purposes of content control or copy protection. For example in one of the HDTV video channels such as the luma (Y) channel, a selected number of pulses are added to the vertical blanking interval to define commands to a compliant device for purposes of content control. Moreover, a selected number of pulses in another video channel such as the chroma (Pb and/or Pr) channels may also carry information (commands) for content control.

A typical added signal here may be at least one pulse. For example, in the Y channel the added signal may be a positive going pulse located in the tri-level sync pulse front and/or back porch region(s). For example, in the Pb or Pr channel(s), the added signal may include a positive and/or negative pulse. Most notably, in the Pb or Pr channels, the blanking level is at 50% of the maximum voltage range (versus 0% in the Y channel), so the front and/or back porch regions can carry positive or negative pulses. Also, the added signal may include a burst of cycles. Depending on the number of cycles, their phase, duration, and/or frequency, content control information is conveyed.

The above signals and pulses may be further modulated. Such modulation may also be part of a method for content control by carrying information defining the commands for purposes of content control. The commands are interpreted (decoded) by suitable circuitry and/or software in a compliant device, e.g., a video recorder, to control subsequent use of the video content. An example of content control is the addition of a set of "pseudo" (e.g., not located according to the HDTV standard) tri-level sync pulses that, when received by a compliant (specially adapted) video recorder, command the video recorder not to record the accompanying video. Another example of content control is the well known CGMS (copy generation management system) for control of copying on a generational basis. Such content control requires co-operation between the suppliers of video content (e.g., DVD vendors, broadcast or signal distribution facilities, etc.) and the manufacturers of compliant equipment (e.g., video recorder manufacturers, PVRs, interface devices, or the like.)

In yet another embodiment, a portion or portions of the HDTV tri-level sync pulse(s) may be modified. For example the positive (or negative) portion of a tri-level sync pulse may be changed in terms of its level. One such example is to lower or increase the amplitude of at least a portion of the positive (or negative) going pulse of a tri-level sync pulse. Depending on which selected tri-level sync pulses are modified, and/or on the level of the modified portion of the tri-level sync pulse, information is conveyed to a content management control system, or at least part of a copy protection signal is produced. It should be noted that a negative and or positive portion of one or more selected tri-level sync pulses may be altered in position and or pulse width; and this type of modification may convey information for a content control system or be used for at least part of a copy protection signal. In this context, copy protection refers to the above-described well known techniques in the video field of altering an otherwise standard video signal so that a conventional receiving device, such as a video recorder, is technically unable to render a useful copy of the video. Copy protection in this context does not require a compliant video recorder (or other compliant receiving device) or any special adaptations therein to be effective.

In yet another embodiment, useful for content control and/or for copy protection, the video signal is modified to cause erroneous results to downstream (receiving) equipment which senses reference portions of the video signal. Such reference portions may include modifications to the amplitude of the positive pulse of a tri-level sync pulse and/or the back porch region following it. For example, on selected scan lines, increasing the level of the positive pulse of the tri-level sync pulse and/or adding a pulse (signal or waveform) in at least a portion of the back porch region, may affect the AGC (automatic gain control) system of a receiving device (e.g., video recorder, video signal distribution network, video signal transmitter), but it may cause minimal effect(s) on a video display device. Furthermore, the addition or insertion of tri-level pseudo sync or tri-level sync pulses which may have modified portions, can also define a copy protection or content control signal. As mentioned above, pseudo sync refers in this context to a process well known in the analog TV field for copy protection where pulses having the same configuration as conventional horizontal synchronization pulses are added to the blanking intervals (typically vertical blanking intervals) to disrupt recording of the video signal by e.g., a VHS video tape recorder, while not having the same disruptive effect on a TV set or monitor. The present added tri-level pulse added signals may have added pseudo sync pulses following them.

With up to three channels (Y, Pb, Pr) of video in HDTV, it is possible to modulate or enable the added pulses dependently or independently on each channel. Modulating or enabling channel independently, for example, can be an advantage to speed up the copy protection effects for a more annoying effect on playback. For instance, if the AGC time constant is about 0.5 second (2 Hz), then "cascading" or modulating the added pulses in multiplexed form between the channels can cause the Y, Pb, and Pr channels (e.g., the entire picture) to fluctuate on playback at an effective 6 Hz rate, which is more effective in terms of copy protection. Of course other frequencies may be adapted for modulation of the pulses or waveforms. On another note, it was discovered on certain component monitors such as an HDTV display, that shifting the sync signal in the Y channel caused an eventual shut down of the display. Thus, it is possible to make a display control system for example by shifting in time the Y channel relative to the other chroma channels as a way to cause certain monitors to shut down or display a more unviewable picture. To restore to normal operation, at least a portion of the Y channel is shifted time wise back, or at least a portion of the chroma channels are shifted time wise to allow a more viewable picture.

Any form of the tri-level pseudo sync pulses or signals or a waveform following them (e.g., a tri-level sync signal or sync signal) may be used for content control. In experiments with commercially available HD monitors, it was found that the overscan area was at least 20 horizontal scan lines for some TFT (thin film transistor) monitor displays and 30 scan lines for some CRT (cathode ray tube) monitor displays. This means that the above modifications may be done on video scan lines outside the vertical blanking area (e.g., on an active portion of the video field or on a selected horizontal blanking interval). (Overscan in the video field refers to active video scan lines that are not displayed by a particular TV set or monitor as being at the (very) top or bottom of the picture or a portion on the right or left side of the picture.)

Also, the above signals may include position separation modulation, pulse-width modulation, frequency modulation, phase modulation, and/or amplitude modulation. Also, the above signals may include a lowering of a tri-level sync pulse back (or front) porch region, such as described similarly for analog TV in Ryan et al. U.S. Pat. No. 5,633,927, incorporated herein by reference in its entirety. In yet another embodiment for copy protection (e.g., a personal video recorder of the TiVo type or digital video recorder such as a hard disk drive or DVD recorder or digital tape recorder), it was found by the inventor that a "gray pulse" in a back porch region on selected lines was enough to cause the recording to have time instability on playback (e.g., playback from a digital recorder). This modified video signal has improved playability over the Morio process for analog TV copy protection (see Morio et al., U.S. Pat. No. 4,100,575 incorporated herein by reference in its entirety) since gray level pulses are used instead of Morio's white level pulses. In this context, gray pulse/signal means generally a signal below peak white level. For example, a 30% to 70%, level of selected duration in a back porch region or a region following an end of a sync signal. This "pulse" may be an arbitrary waveform whose average level is below an average peak white level. The use of gray level pulses is applicable to HDTV signals as well for copy protection (and/or content management).

In addition to the above-described methods for modifying a video signal, there is an associated apparatus for carrying out such a method. This apparatus includes, in one embodiment, an input port adapted to receive a video signal generally conforming to a digital television standard, such as the HDTV standard, but not so limited, and having a tri-level synchronization pulse associated with each of the blanking intervals of the video signal. Moreover, the apparatus includes a processor coupled to the input port and which modifies a portion of the video signal which is associated with at least one of the tri-level synchronization pulses. Thereby the modified video signal is of a type to inhibit subsequent recording thereof and/or carries information relating to controlling its subsequent use. Moreover, the apparatus includes an output port coupled to the processor to output the modified (copy protected for instance) video signal. Thereby, the modifying may include modifying at least one tri-level synchronization pulse and the modifying may occur in at least one of the luma or chroma channels of the video signal.

Further, the modifying may include lowering or raising an amplitude of the back porch of the tri-level synchronization pulse. The modifying may include lowering the amplitude of the back porch to at least 20% below the peak white level of the video signal. Moreover, the modifying may include altering an amplitude of a portion of the tri-level synchronization pulse to render positive and negative going portions of the pulse asymmetrical. Further, the modifying may include altering at least one of a position, amplitude or width of the tri-level synchronization pulse. Additionally, the modifying may include modifying a plurality of tri-level synchronization pulses in the video signal, where the modification to the pulses varies between different scan (horizontal) lines of the video signal.

Further, the modifying may include adding at least one pulse, at least in part, to the blanking interval. The added pulse may extend into an active video portion of the video signal scan line. The active video portion may be in the overscan portion of a field of the video signal where the modification is made. Further, the modifying may include adding the pulse in a blanking interval prior to, or following a location of the tri-level synchronization pulse.

The modifying may also include adding the pulse in at least one of the luma or chroma channels of the video signal. The added pulse may have a portion which is positive or negative going and may have the configuration of a tri-level synchronization pulse. Also, the modifying may include adding the added pulse on a front or back porch of the tri-level synchronization pulse.

Further, the modifying may include adding a plurality of pulses to the blanking interval. The modifying may include adding a pulse to a plurality of blanking intervals where a character of the added pulses varies between different scan lines of the video signal, and the character that varies may be at least one of a position, amplitude, width or a number of added pulses. Further, the added pulse may be a gray level pulse added to a back porch portion of the tri-level synchronization pulse. The added pulse may have a duration one third to double that of the tri-level synchronization pulse with which it is associated.

Additionally, the digital television standard may be the HDTV standard. This digital standard may be 720 line progressive scan or 1080 line interlace scan. The modified signal portion, as modified by the apparatus, may in at least in part define a predetermined command for content management (subsequent use) of the video signal. Alternately, the modified portion of the sign may inhibit subsequent recording of the video signal by causing a sensing system in an apparatus which receives a video signal to produce and erroneous output. The modified portion may be in at least two channels of the video signal. In this case, the modifications of the modified portion of the video signal may differ between the two channels.

Additionally, the modified portions may be in selective scan lines of the video signal in active video adjacent to the vertical blanking interval of the video signal. Further, the input part of the apparatus may be adapted to receive three channels of the video signal, including for instance, one luma and two chroma channels. The output port may be adapted to output three channels of the modified video signal also.

Further, the apparatus, which includes the processor, may include a reference signal detector coupled to the input port and having an output port. Additionally, there may be a memory coupled to the output port of the reference signal detector and adapted to store a plurality of values pertaining to the modified portion of the video signal, and a combiner coupled to the input part of the processor and to the memory, an output port of the combiner being coupled to the output port of the apparatus. Further, there may be at least one counter associated with the memory.

Other embodiments are various defeat methods to modify or reduce the effects of the above or to change the outcome of a content control system, and associated defeat apparatus also for modifying or reducing the effects or change the outcome of same.

BRIEF DESCRIPTION OF THE DRAWINGS

FIG. 1A is a block diagram of the present system for modifying video.

FIG. 1B is a block diagram showing a content control device receiving a modified signal, which is read, and a command signal is then sent to a compliant device FIG. 2 is a block diagram of the FIG. 1A system showing other video channels.

FIG. 3A shows a prior art waveform of an HDTV video signal.

FIG. 5A and FIG. 5B show a further modification whereby at least a part of the front porch and/or back porch is lowered.

FIG. 6A shows the addition or insertion of tri-level pseudo sync pulses, which may have an arbitrary positive or negative (pulse) duration/amplitude.

FIG. 6B shows a signal inserted or added following a tri-level pseudo sync pulse for one or more selected lines; optionally, a portion or portions of a region following the tri-level sync pulse may be lifted or lowered; also optionally a signal added or inserted after a tri-level sync pulse may be modulated.

FIG. 6C shows that a signal inserted or added following a tri-level sync signal may be amplitude and/or position and/or pulse-width modulated; this tri level sync signal may include a tri-level pseudo sync pulse and/or tri-level sync pulse; optionally a portion or portions of a region following this tri-level sync signal may be lifted or lowered.

FIG. 6D shows that one or more tri-level pseudo sync pulses may be added to a video line; following these (one or more) tri-level pseudo sync pulses optionally a signal may be added or inserted afterwards; optionally a signal may be added or inserted after a tri-level sync pulse.

FIG. 6E shows an insertion of tri-level pseudo sync pulses; optionally a signal may be added or inserted after a tri-level sync pulse.

FIG. 7 shows tri-level pseudo sync pulses where by the positive going pulse of the tri-level sync may be varied in level; optionally a signal following the tri-level pseudo sync pulse may be modulated; and optionally a portion or portions following the tri-level pseudo sync pulse may be lifted or lowered.

FIG. 8 shows that a negative and/or positive portion of tri-level sync or tri-level pseudo sync may be modulated or varied in amplitude and/or position and/or pulse-width.

FIG. 10A shows a prior art tri-level sync pulse; FIG. 10B shows a shifted position negative sync portion of a tri-level sync pulse; FIG. 10C shows a narrowed negative portion of a tri-level sync pulse; FIG. 10D shows another narrowed negative portion of a tri-level sync pulse.

FIGS. 13A and 13B each show a waveform modification that causes instability on a video recorder.

DETAILED DESCRIPTION

Content Management Modification

Figure 3B:
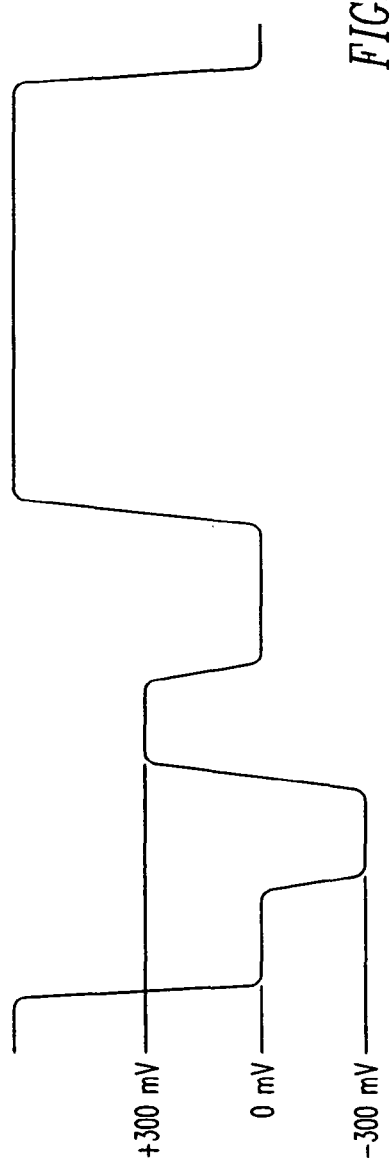
FIG. 3B shows a prior art waveform of an HDTV video channel (e.g., Y, luma)

FIG. 1A shows an HDTV signal source, which may be analog or digital, providing a video signal In on line(s) 2 coupled to a modifier circuit 4. (HDTV signals, while broadcast in digital form, may be readily converted to the analog domain.) The output signal of the modifier circuit 4 on line(s) 6 contains video program material that has content control and/or copy protection added or inserted in accordance with this disclosure. (In this context of a particular circuit, "line" here refers to a signal conductor or set of signal conductors, not a video scan line.)

FIG. 1B shows a (generic) reader 3 of content control/copy protection signals received on lines 6 (from FIG. 1A) coupled into (generic) compliant device 5. Reader 3 is e.g., a video recorder, video player, etc. Compliant device 5 is, e.g., a video recorder, transmitter, analog to digital converter, universal serial bus, etc. Reader 3 receives a modified input signal (e.g., HD video signal) and couples the input signal plus the read command to the compliant device 5. The modified input signal includes the three conventional channels Y, Pb, Pr each potentially including (as the modifications) pseudo-sync pulses (PS), AGC pulses, and back porch pulses (BPP) all further described below. Compliant device 5 may then modify its output signal at port 7 by shutting down or passing on an extra signal at output port 7 (or modify its output signal via selected attenuation or addition). For example, if the command is to prevent recording or viewing, the output signal at port 7 of compliant device 5 is muted or attenuated. Or, if the command is to pass along a content control or copy protection signal, compliant device 5 may not shut down, and it would pass along at port 7 an extra signal or a signal modification.

FIG. 2 shows an example of an HDTV video system in accordance with this disclosure for modifying a video signal which is similar to FIG. 1A but shows all three HDTV video channels. At least one of these video channels is processed or modified by the processor 10 which corresponds to the modifier circuit 4 in FIG. 1A. For instance, luma video signal Y is coupled to a timing circuit 8, which generates timing for insertion of added signals by processor 10. These added signals may be provided by signal generators V1, V2, V3. The output of processor 10 (on lines 6) then may include added signals following a tri-level sync pulse. That is, a signal (e.g., pulse or waveform) is added by the processor 10 that follows a (tri-level sync) reference signal comprised of a negative pulse followed by a positive pulse. For each channel such as Y, Pb, Cr, there may be individual tri-level sync pulse modifications, back porch region signals, front porch region signals, tri-level pseudo sync pulses, and/or signals or pulses following tri-level sync and/or tri-level pseudo sync pulses. Any of these signals may be modulated in terms of pulse-width, frequency, position, phase, and/or amplitude.

As an example, selected scan lines in the Y channel will have an added positive pulse (e.g., pulse or waveform) following a negative and positive (e.g., tri-level sync pulse) reference signal. The selected scan lines are in the VBI (vertical blanking interval) vicinity, such as scan lines toward the bottom of the active field and/or selected scan lines in the VBI, and/or selected scan lines toward the top of the active field. Each signal generator V1,V2, and V3 outputs signals inserted into each channel respectively, for example. Hence these signal generators output waveforms, static or dynamic, to be incorporated into the incoming video program signal. As a further example in the Y channel, the number of pulses referenced to an origin in time, such as the vertical sync pulse, conveys various content control commands, e.g., for a CGMS command set. The use of two (or more) video channels with added pulses can further convey content control commands to a compliant receiving device.

FIG. 3A shows (in an analog waveform representation, as is conventional) a portion of a typical prior art HDTV video signal, which contains a tri-level sync pulse having levels a1 and b1, and a reference back porch level c1. The pulse level a1 may be used by a sync separator to generate a pulse that allows the detection of levels b1 and/or c1. Detecting the zero crossing from level a1 to b1 can generate a more precise timing signal from the sync separator than just sensing of level a1. Since a clamp or a black level reference can be determined from level c1, and an amplitude reference can be determined from level b1 (e.g., level b1's peak amplitude), these detected signals are used conventionally to adjust the black level and/or the video gain of an HDTV signal.

Figure 3C:
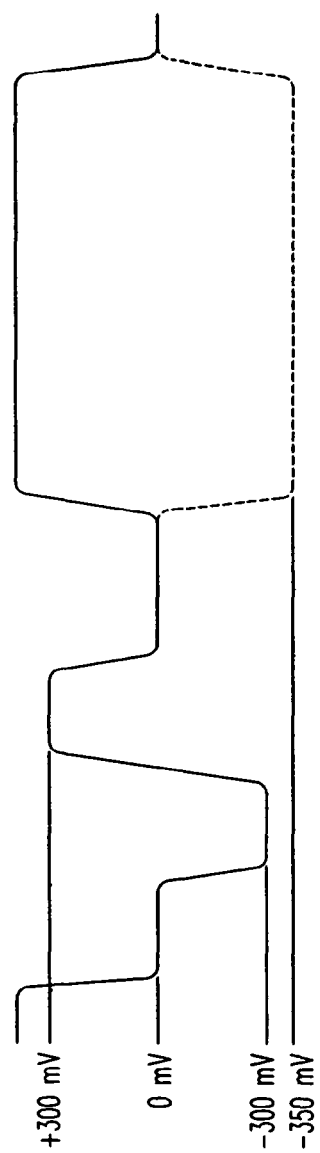
FIG. 3C shows a prior art waveform of another HDTV video channel (e.g., Pr or Pb, chroma)

FIG. 3B shows an example of a (prior art) standard tri-level sync pulse of a video signal for the Y (luma) channel with amplitudes (in mV) indicated along the vertical axis. The HDTV standards 720p or 1080i are applicable to this example but this is not limiting. FIG. 3C shows an example of a (prior art) standard tri-level sync pulse video signal in the Pb and/or Pr channels. HDTV standards 720p or 1080i are also applicable to this example, but again this is not limiting. In an example of generating a content control signal and or at least part of a copy protection signal, a selected set of tri-level sync pulses or a portion of a tri-level sync pulse may be inverted, moved in position time wise, deleted, and or modified in average energy level (e.g., pulse width and or amplitude alteration).

Figure 4A:
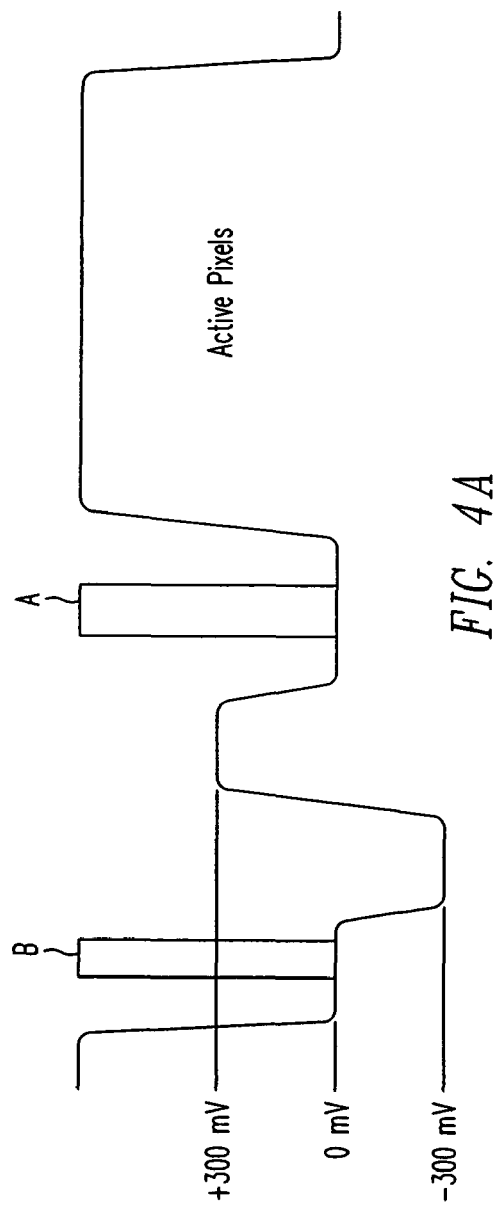
FIG. 4A shows modifications to a video channel that may be used for content control and/or copy protection.

FIG. 4A shows, in accordance with this disclosure, an example of an added pulse A, following the conventional tri-level sync pulse for the HDTV Y channel. Pulse A may be added prior to (in time) the active video scan line portion ("Active Pixels"). In some cases, pulse A may encroach on the active video ("Active Pixels"). FIG. 4A also shows added pulse B, located prior to the tri-level sync pulse. Pulse B may encroach into active video (of the prior scan line) as well. In one example for the Y channel, pulse B may be set to zero amplitude and pulse A set to an amplitude in the range of 10% to about 100% (or more) of peak white amplitude. Of course, other amplitude ranges are usable (e.g., less than 10%). An exemplary duration of signal pulse A is in the range of 100 ns to at least 1.5 μsec. Pulse A and/or pulse B may be a waveform signal (e.g., which is more complex than a single pulse). For example, the waveform may be a (modulated) train of sine and/or rectangular waves, or an arbitrary signal. Pulse/waveform A and or pulse/waveform B may have a level that is negative (e.g., may fall in a range from 0 to −200 millivolts), or may include a negative going waveform.

Figure 4B:
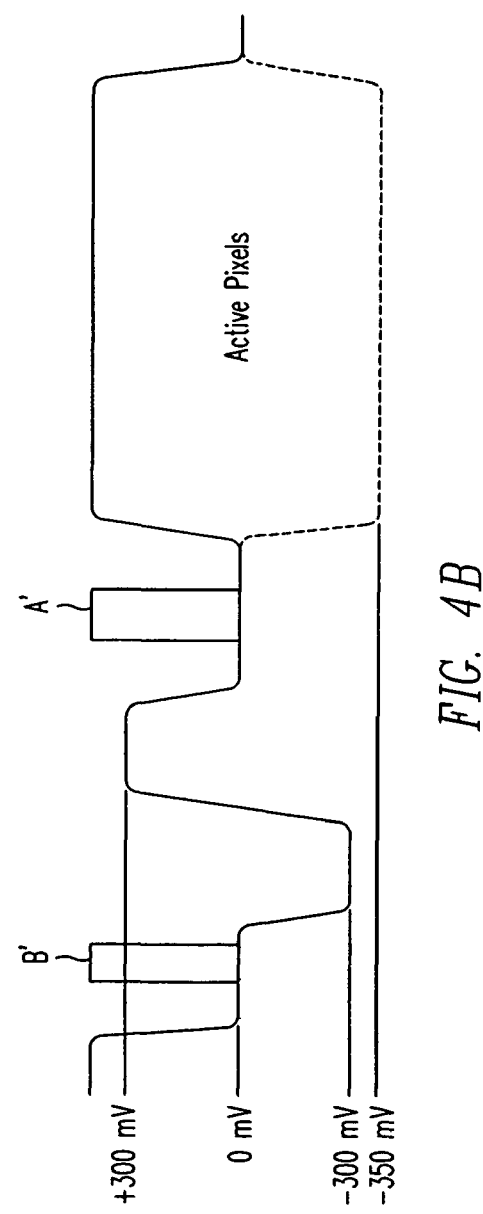
FIG. 4B shows modifications to another video channel that may be used for content control and/or copy protection.

FIG. 4B show similarly added pulses A', B' in the Pr and/or Pb channels. The locations of pulses A' and/or B' may be different from that of pulses A and B. Also, pulse A' and/or B' may be different waveforms as well, compared to pulses A and B. In one example for the Pb and/or Pr channel, the amplitude of pulse B' may be set to zero and that of pulse A' set in the range of 5% (e.g., +15 mv) to about 50% (e.g., +300 mV) of peak white level. Of course, other values are usable. An exemplary duration of pulse A' is 100 ns to at least 1.5 μsec. Pulse A' and/or B' may be a waveform other than a pulse such as an arbitrary signal. Pulse/waveform A' or B' may include extending to a negative voltage or go below a blanking level). Pulse A' or B' may be placed in a vicinity of a horizontal (and or vertical) blanking interval, and thus the vicinity of a horizontal blanking interval may include a portion of an active video line.

FIGS. 5A and 5B further show examples of the present modification, including lowering a part of the front and/or back porch sync pulse region by added pulses D,C, D', and/or C'. Lowering a portion of the front and/or back porch may be used to reduce or modify undesirable playability effects, or this lowering may enhance a copy protection or a content control signal, and/or as a way to convey further information (comments) in a content control system. An example is to lower to a negative level of about 0% to −20% of peak white level, but other negative values are usable. For example, D,C, D', and or C' may be an arbitrary or selected waveform that includes any level in a range of greater than −30% white to a level above blanking level. Also, this waveform from the previous sentence may include one or more pulses or signals.

FIG. 6A shows an example of inserting or adding tri-level pseudo sync signals, each having positive and negative going portions and having also an added back porch pulse 13 immediately following, into selected scan lines of the video signal. The genuine tri-level sync pulse is a1, b1 as in prior art FIG. 3A. These pseudo sync signals may be of arbitrary positive or negative pulse duration. Also, these pseudo sync signals may be varied in amplitude or frequency. This insertion would typically be in the VBI so as not to interfere with active video, but not necessarily.

FIG. 6B shows an example of adding a signal 25' (back porch pulse) following a negative/positive pulse (e.g., tri-level sync pulse). This added pulse 25' may be varied in width, position, and/or amplitude as indicated graphically by the superimposed arrows. Added pulse 25' may be a waveform and 25' may include a level between −30% white level and a level above blanking level. Also at least a part of the back porch (e.g., levels 26' and/or 27') region may be raised or lowered as indicated by further superimposed arrows. Also shown in FIG. 6B are the (optional) tri-level pseudo sync pulses each being a pulse pair designated 20N, 20P, and the optional added pulses 21 that follow. An example of the pseudo sync pulse duration is from about ⅓ to twice the duration of a standard tri-level sync pulse. As an example, the pseudo sync pulse may be substantially close in amplitude to that of a tri-level sync pulse, but other amplitudes for the negative and/or positive going pulses 20N and/or 20P are possible. FIG. 6C shows a similar waveform as FIG. 6B, but the (optional) back porch pulse 21' that follows a tri-level pseudo sync pulse may be varied in width, position, and/or amplitude as indicated by the arrows. Also, at least one region following the tri-level pseudo sync pulse may be raised or lowered in amplitude as shown at 22', 23'. 21' may be a waveform whose level may include a negative level.

FIG. 6D shows a similar waveform to that of FIG. 6B, but with an increased or varied repetition rate or frequency for the tri-level pseudo sync pulses 20N, 20P or back porch pulses 25' following the tri-level pseudo sync pulses. Note that the number of tri-level pseudo sync pulses and/or number of added pulses following them may convey information for a content control system. FIG. 6F shows a waveform similar to that of FIG. 6D where a number of tri-level pseudo sync pulses 20N, 20P are added. Here, for example, the number of tri-level pseudo sync pulses 20N, 20P may convey information for a content control system.

Note that any signal modifications shown in FIGS. 4A to 6E or FIGS. 7 to 9F, 10B to 10D, or 13A or 13B may be used for copy protection or content control for some HDTV analog equipment or interfaces. Here added signals that follow tri-level pseudo sync pulses may affect some AGC systems in such receiving devices (in the analog domain) to produce a copy protection effect. Also, for example, any added signal that is modulated can produce a dynamic (time varying) copy protection effect. In another example an added or inserted waveform following a tri-level sync pulse may also cause clamp or display problems for a selected monitor or display. By knowing how to select the waveform, some displays or interface devices will be affected and others will not. For example, a series of (e.g., tri-level) pseudo sync pulses in a VBI may have no display artifacts in one HDTV standard such as 1080I, but in 720P, display artifacts show up. And in other displays, pseudo syncs affect interlaced scan displays but not as much in progressive scan devices. And standard definition standards may be used as well. Thus, it is possible to control playing the scan standard by using selected pseudo sync or tri-level pseudo syncs for interlaced and non interlaced devices. Of course selected AGC pulses may follow any selected (tri-level) pseudo sync pulses.

The modification techniques of FIGS. 4A to 6E may be used for content control purposes as well. For example, commands for content control may be a function of the number of or nature of any combination of pulses shown above A,A',A", A'",B,B',B",B'",C,C',D,D',25', 21,21' and be located on any of the video channels (e.g., Y, Pb or Pr). As a further example, the amplitude or position or duration of any portion of the above (or below) described pulses may be used to convey information (e.g., commands) for a content control (content management) system. Also a particular pattern of pulses/waveforms per line or pulses/waveforms per set of lines may convey a command for content control. It should be noted that in certain circumstances, the waveforms or pulses denoted by A,B, A',B',A",B",A'",B'",25',21, and or 21' may have at least a portion at a negative level (e.g., the level may extend to at least a sync tip level or above a sync tip level). Similarly waveforms or pulses D,C,D', and or C' may have at least a portion at a negative level that can go at least down to a sync tip level. It may also be noted that a position separation that may include zero, may exist between the trailing edge of D and B", C and A", D' and B'", and or C' and A'". The waveforms D,B",C,A",D',B'",C', and or A'" may be inserted in any combination including a combination of one waveform or pulse. The waveform or pulse insertion/addition may occur in a blanking interval or a portion of an active video line.

FIG. 7 shows a waveform illustration of a modification of the tri-level pseudo sync pulses. Here the positive portion of the tri-level pseudo sync pulse has at least a portion changed in amplitude (e.g., pulse 12'). One result for example, is to provide an asymmetrical tri-level pseudo sync pulse, meaning the negative and positive going portions differ in duration and/or absolute value of their amplitude. The amplitude of the latter or a (normally) positive portion of the tri-level pseudo sync pulse may range, for example from about −20% to +100% of peak white level. Optionally, back porch pulses 21' may be added along with pulses 22 and 23.

FIG. 8 shows in a waveform illustration a yet more flexible technique for modifying any portion of the negative and/or positive portion of the (regular) tri-level sync pulse and/or of the (added) tri-level pseudo sync pulses. Here at least part of either (or both) negative or positive portion of the tri-level sync/pseudo sync pulse exhibit variation in amplitude, width, and/or position (or edge position) as indicated by the various superimposed arrows. Also shown in FIG. 8 are "inflection points" 29 and 31, whereby each of these points anchors a particular signal voltage level. For, instance, if pulses b1' and 12' are delayed, the inflection points 29 and 31 may be set at about blanking level; but a level other than blanking level (e.g., for the inflection point) is usable, such as +10% or −10% of peak white level. The inflection points described above may represent a gap voltage. This gap voltage may be set to an arbitrary voltage that is at blanking level or above blanking level or below blanking level. And this gap voltage is not limited to ±10% of peak white level.

Figure 9A:
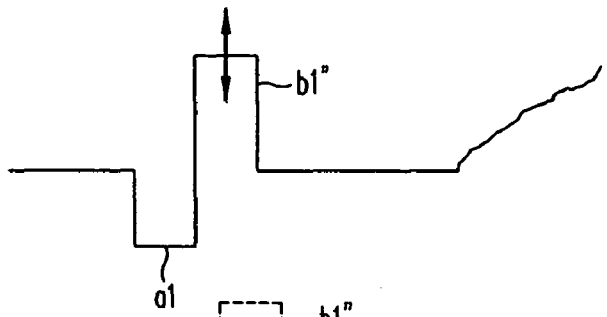
FIG. 9A shows at least a portion of the positive pulse of a tri-level sync pulse varied in level; this variation in level for example may range from below blanking level to above blanking level.
Figure 9B:
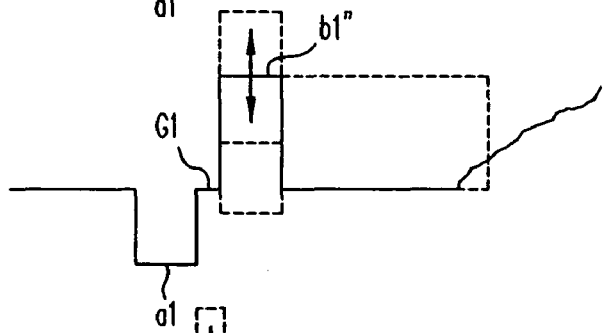
FIG. 9B shows a gap between the trailing edge of the negative pulse and the leading edge of the positive pulse; this gap may include zero separation; also, the positive portion may extend into a back porch portion and/or an active video portion. Gap voltage G1 may assume a blanking (e.g. about 0 volt) or non blanking level voltage (e.g., a positive and/or negative voltage).
Figure 9C:
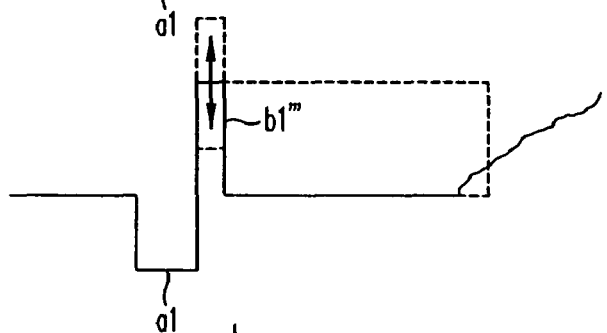
FIG. 9C shows a narrowed positive portion of a tri-level sync pulse, which may be varied in level.

FIG. 9A shows in a waveform illustration an example of a tri-level sync pulse modified at its positive portion. Here the superimposed arrow at pulse b1' shows that the positive portion is changed in amplitude or level. The modified level can extend to below blanking. Also, the FIG. 9A modification is applicable to a tri-level pseudo sync signal. FIG. 9B shows an example of a tri-level sync pulse modified at b1" with a positional shift in this positive portion of the tri-level sync pulse. The positive portion amplitude of this sync pulse may be varied as well. The dotted line shows that the positive portion of the tri-level sync pulse may be extended, even to the following active portion of the video scan line. Shown in FIG. 9B is a gap level G1, which is part of the modification. The gap level G1 may be represented by an inflection point. The method of FIG. 9B is also applicable to a tri-level pseudo sync signal. FIG. 9C shows an example of narrowing at b1'" a positive portion of the tri-level sync pulse. Also, shown via dotted lines, is that this positive pulse portion may be widened (extended in duration) as well. This widening may extend to the active portion of the video scan line. Also, the amplitude of this portion may be varied. The method of FIG. 9C is also applicable to a tri-level pseudo sync pulse. It should be noted that G1,G2, and or G3 may be set to a non blanking or a blanking level.

Figure 9D:
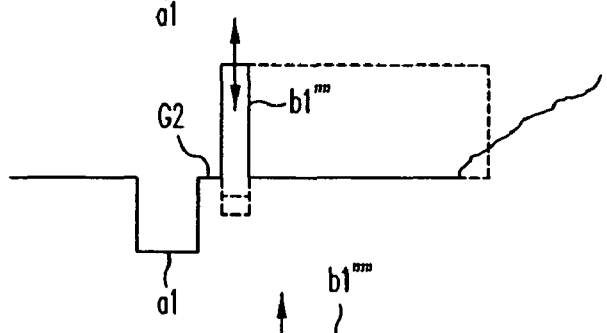
FIG. 9D shows a narrowed and/or shifted positive portion of the tri-level sync pulse.
Figure 9E:
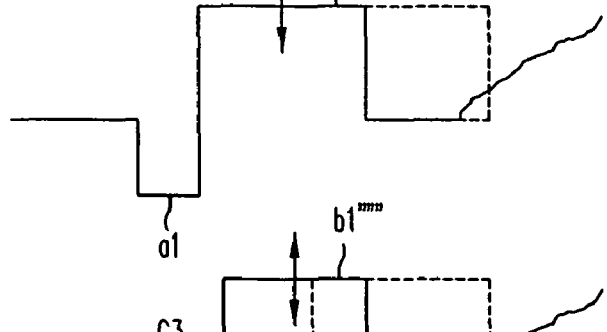
FIG. 9E shows an extended duration positive portion of a tri-level sync pulse.
Figure 9F:
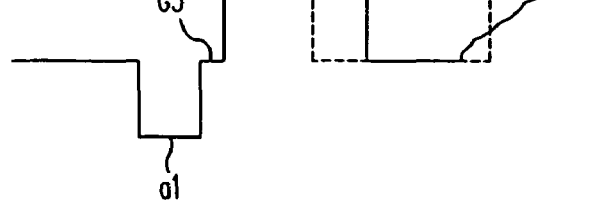
FIG. 9F shows a gap between the negative and positive portions of a tri-level sync pulse; the positive portion may be extended in duration.

FIG. 9D shows an example of positive portion of the tri-level sync pulse that has been narrowed (reduced in duration), or narrowed and shifted at b"". Again, optionally, the positive portion may have its amplitude varied. Also shown is that the (optional) extension of the positive pulse portion is allowed to the active portion of the video scan line. Also shown is that the positive portion may be varied in level (amplitude). The method of FIG. 9E is also applicable to a tri-level pseudo sync pulse. FIG. 9E shows at b1"" an extended positive portion of a tri-level sync (or tri level pseudo sync) pulse. This positive portion may also be varied in amplitude and/or extended to the active portion. FIG. 9F shows at b1"'" a shifted and extended positive portion of a tri-level sync (or tri-level pseudo sync) signal. This positive portion may also be varied in amplitude and/or extended up to the active portion.

FIG. 10A shows again a waveform illustration of a prior art tri-level sync pulse, which is conventional (standard.) FIG. 10B shows a negative portion tri-level sync pulse modification of the FIG. 10A waveform where it is advanced or shifted at a1', leaving a gap level G4. The negative pulse portion a1' may be optionally varied in amplitude. Also, the method of FIG. 10B is applicable to an added tri-level pseudo sync pulse. FIG. 10C shows a tri-level sync pulse whose negative portion is narrowed on its trailing edge at a1". A gap level G5 is left. The negative portion a1" may optionally be varied in amplitude. Also, the method of FIG. 10C is applicable to an added tri-level pseudo sync pulse. FIG. 10D shows a tri-level sync pulse whose negative portion is narrowed even more. This negative portion may also be shifted in time. The narrowing and/or shifting leaves a gap level G6. The negative portion a1''' may optionally be varied in amplitude. Also the method of FIG. 10D is applicable to an (added) tri-level pseudo sync pulse. Gap level G5 or G6 may be set to a non blanking level or to a blanking level. The a1,a1',a1" and a1''' may be position shifted, pulse width altered, and or amplitude modulated.

Figure 11A:
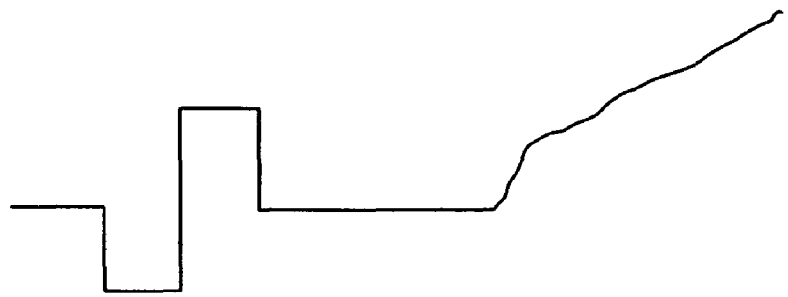
FIG. 11A shows a prior art video signal.
Figure 11B:
FIG. 11B shows a resulting output of a sync separator circuit.
Figure 11C:
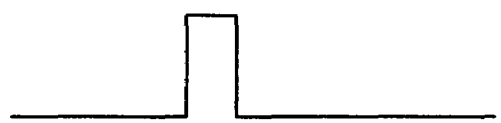
FIG. 11C shows a positive portion sample signal for a tri-level sync pulse.
Figure 11D:
FIG. 11D shows a back porch sample signal.
Figure 11E:
FIG. 11E shows a negative portion sample signal for a tri-level sync pulse.
Figure 12:
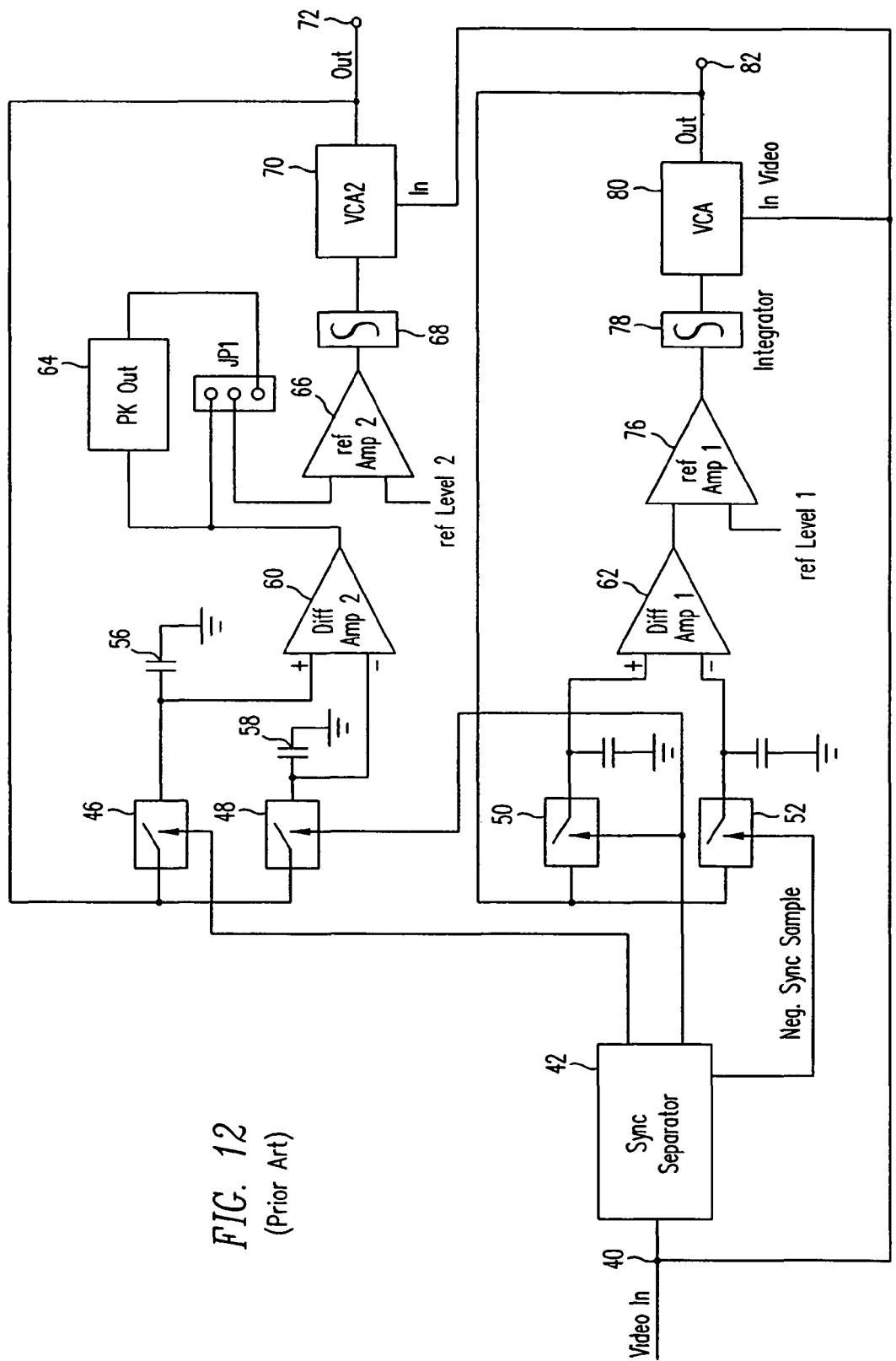
FIG. 12 shows a typical prior art circuit for automatic gain control.

FIG. 11A shows a waveform illustration of a standard (prior art) tri-level sync video signal including part of an active video scan line. FIG. 11B shows the associated sync separator circuit output signal, which outputs a pulse indicative of the negative going pulse of the tri-level sync pulse of FIG. 11A. (This prior art sync separator is part of a prior art AGC system as shown in FIG. 12). FIG. 11C shows a pulse that could be triggered from the trailing edge of the signal of FIG. 11B to produce a sample pulse for the positive portion of the tri-level sync. FIG. 11D shows a pulse derived from the signal of FIG. 11B or 11C, which is located in a back porch region of the standard tri-level video signal. FIG. 11E shows a sample pulse for the negative portion of the tri-level sync video signal.

The waveforms of prior art FIGS. 11A-E illustrate that sometimes the negative portion of the tri-level sync pulse is distorted or attenuated, and even an AGC system having higher reliability than one operating as shown in FIGS. 11A-E would rely on sampling the positive going pulse of the tri-level sync and at least part of the back porch region. Thus, the modifications described above to modify at least a portion of the tri-level sync and/or a back porch region, can advantageously affect operation of any such an AGC system or video system that utilizes a tri-level sync pulse video signal, so as to achieve copy protection.

FIG. 12 shows an illustration of a conventional AGC (automatic gain control) system associated with the waveforms of FIGS. 11A to 11E and of the type used in an HD device such a high definition TV set, display, recorder, video processor, chip set, interface device, or the like using voltage samples of the positive part of the tri-level sync pulse and a back porch region via output terminal OUT2, or an AGC system using a back porch region's voltage level with a negative portion's level of the tri-level sync via output terminal OUT1. FIG. 12 shows why some of the HD video modifications described here cause erroneous measurements in a typical HDTV AGC circuit. Operation of the prior art AGC circuit of FIG. 12 is conventional. The input video signal is applied at input terminal 40 to sync separator 42, the two output signals of which control switches 46, 48, 50, 52. There is an upper feedback loop including capacitors 56, 58, differential amplifier 60, peak detector circuit 64, jumper JP1, operational amplifier 66, integrator 68, and voltage controlled amplifier 70 driving output terminal 72. The lower feedback loop includes also differential amplifier 62, operational amplifier 76, integrator 78, and voltage controlled amplifier 80 driving output terminal 82. The function of each loop is to control its voltage controlled amplifier 70, 80 so as control a level of the output video at terminals 72, 82. In a further example, depending on the signal coupled to switch 50's control line, the magnitude of the negative portion of the tri-level sync is measured if 50's control signal occurs during a blanking level such as a portion of the front or back porch. In another example, if the 50's control signal occurs during a positive portion of the tri-level sync pulse, then the magnitude of the tri-level sync pulse (positive peak minus negative sync tip) is measured. Finally, if the positive peak of the tri-level sync is measured, switch 46's control signal may receive a signal from sync separator 42 that is a pulse coincident with a portion of the positive pulse of the tri level sync, and switch 48 will receive a control signal coincident with a portion of a front or back porch. Some of the embodiments disclosed are intended to cause erroneous operation of this AGC circuit. For example, modifying (e.g., in a portion of) either or both positive or negative portion of a tri-level sync pulse with cause an erroneous measurement (e.g., in an AGC system or in a clamp circuit). A modification of a portion of a back or front porch region, which is normally used for reference levels, can lead to erroneous measurement (e.g., in an AGC system or in a clamp circuit).

The present inventor has found that for analog TV (not HDTV) for selected lines, raising a portion of the horizontal sync back porch region to a "gray level" such as 40% of peak white level is sufficient to create a copy protection effect on a digital recorder. The resulting playback creates instability on a video display (e.g., TV set). The present inventor also found a similar instability effect can be accomplished by modifying n scan lines of a highly raised back porch portion combined with m scan lines of a lesser raised back porch portion. For example, n can be a cluster of (4 of 12) scan lines at about 100% of peak white level (or near a white level), while m may be the remaining (8 of 12) scan lines in the cluster at about 35% of peak white level (or a gray level) for the raised back porch area.

FIG. 13A shows a conventional sync pulse, here with the usual color burst signal with gray level pulse after a sync pulse, and FIG. 13B shows a higher amplitude pulse placed after a sync pulse. Combining different levels of gray pulses for raising a horizontal sync back porch region may be used with tri-level sync pulses as well. It is possible to apply this to a positive portion of the tri-level sync pulse (e.g., m scan lines are raised X % (e.g.,) 20% of peak white level for a positive portion of a tri-level sync pulse, while n scan lines are raised Y % (e.g., 60%) of peak white level for a positive portion of the other tri-level sync pulse. Of course one or more (different) gray pulses may be inserted or added after a tri-level sync pulse whether modified or not, which would result in a modification to a tri-level sync TV signal. One result from modifying selected tri-level sync pulses and or a portion of selected back porch regions is a copy protection effect.

Figure 14A:
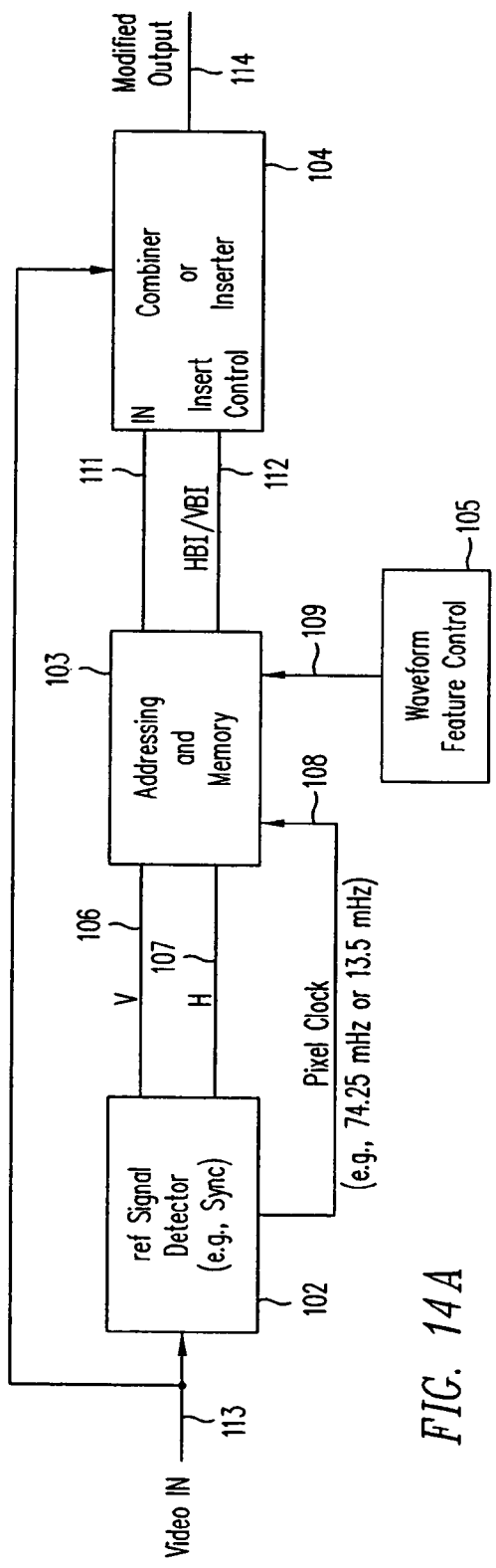
FIG. 14A shows an apparatus for modifying a video signal.

FIG. 14A shows an example of a block diagram for an apparatus for generating or modifying a tri-level sync pulse video signal such as HDTV. The resulting modification of the blanking intervals and/or overscan portions of the video signal can be applied to video media and/or media players such as tapes/discs and/or DVD players. Such modifications to tri-level sync pulses and/or the back porch modification described above are useful in this context. In FIG. 14A, a program video input signal "video in" is coupled at terminal 113 to a reference signal detector such as a sync separator 102 in a video receiving device (such as a video recorder) suitable for recording HDTV. Sync separator 102 then outputs a vertical (V) or frame reference signal on line 106 along with a horizontal (H) scan line signal on line 107. Also sync separator 102 may include a pixel clock regeneration circuit outputting a pixel clock signal on line 108. For example in HDTV, the pixel clock frequency is 74.25 MHz (or some other frequency) and is generally (but not always) locked to the horizontal scan line frequency.

Figure 14B:
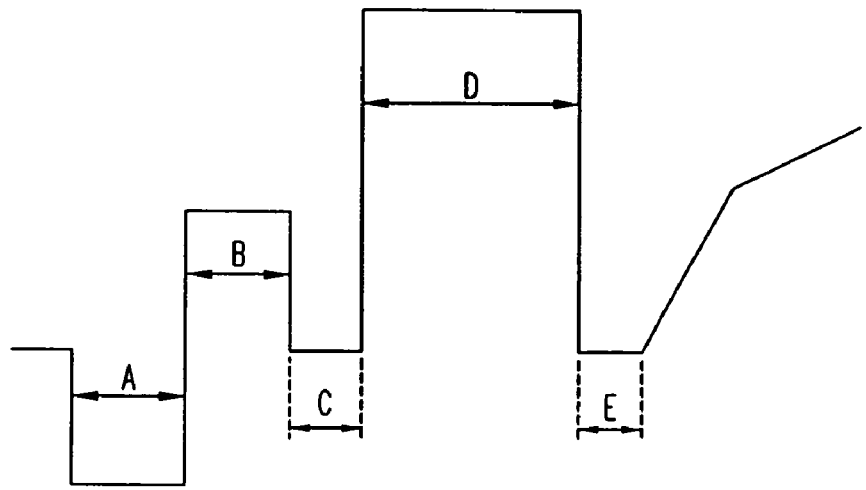
FIGS. 14B and 14C show modifications to HDTV signals for 1080i and 720p HDTV.
Figure 14C:
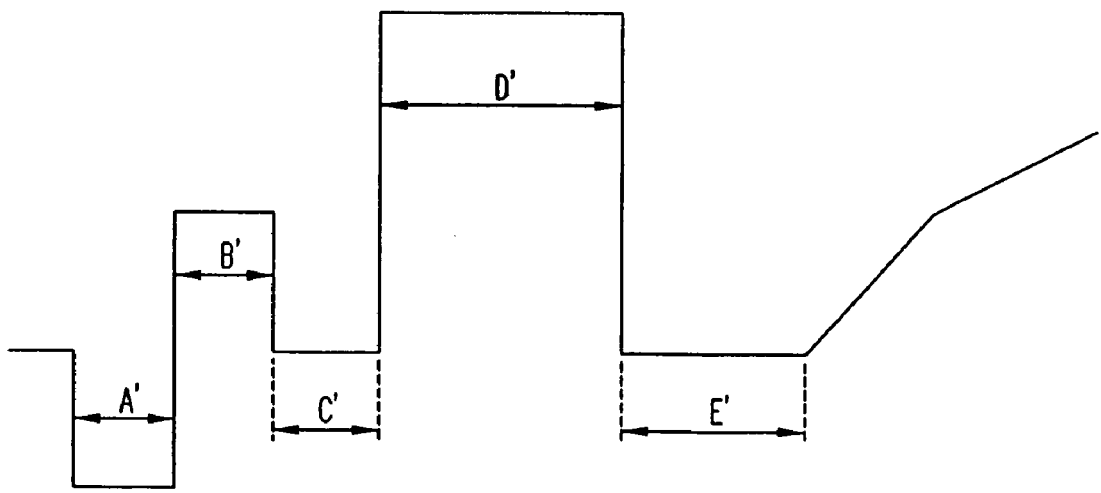

The separated vertical or frame signal V on line 106, the horizontal line signal (H) on line 107, and the pixel clock reference signal on line 108 are coupled to an addressing and memory circuit 103. With these three signals coupled to addressing and memory circuit 103, any pixel location within a video field or frame may be defined with a corresponding value in the memory of circuit 103. This value from memory circuit 103 then is inserted or added to the (selected) blanking intervals or an overscan portion of the video signal. The memory circuit 103 may be programmed via line(s) 109 by waveform feature control circuit 105 for waveform control. Circuit 105 for example may place raised back porch pulses in selected scan lines of the video signal. Or, circuit 105 may regenerate portions of the video signals to include modified tri-level sync pulses or modified back or front porch levels, or newly generated signals (e.g., tri-level pseudo sync pulses and/or signals following them) in blanking or overscan areas of the video signal. The output signal of memory circuit 103 on lines 111, 112 then contains the modification signal(s) to be inserted or added to combiner/inserter circuit 104. Signal 112 may couple a control signal to 104 that inserts or adds part of a waveform an active portion (and or a blanking portion) of a video signal. Combiner circuit 104 then combines or inserts the signal modification at selected lines (and/or pixel locations) with the incoming video signal from terminal 113 coupled to circuit 104. The output of combiner circuit 104 then is the video modified signal at output terminal 114. For example, see the associated output signal waveforms of FIGS. 14B and 14C whereby D and D' respectively show added pulse or waveform modifications to the tri-level sync pulse for selected scan lines. In example FIG. 14B, this modification is applicable to, e.g., scan lines 1118 to 1125, 7 to 20, 555 to 562 and 519 to 582. The duration of pulses A and B is 600 ns; of C is 370 ns; of D is 1260 ns; of E is 370 ns. Pulse D has an amplitude of 20% to 100% of peak white level. In example FIG. 14C, this modification is applicable to, e.g., scan lines 741 to 749 and 6 to 20. The duration of pulses A' and B' is 550 ns; of C' is 566 ns; of D' is 1307 ns; of E' is 997 ns. Pulse D' has an amplitude of 20% to 100% of peak white level. Of course other amplitudes, durations, and or positions of pulses or waveforms are usable.

Figure 15B:
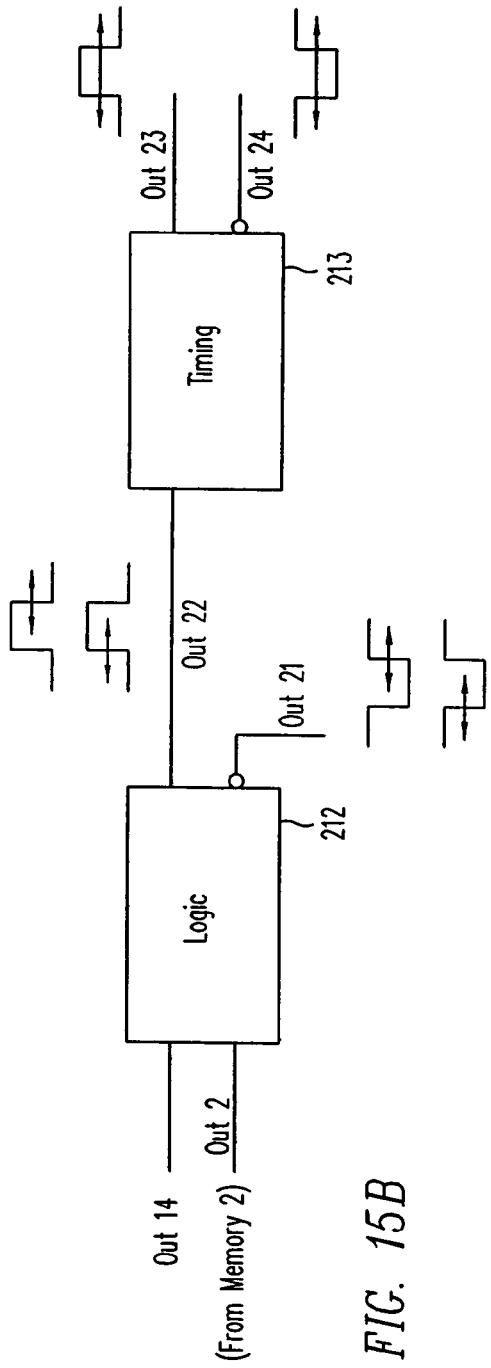
FIGS. 15A, 15B and 15C show yet another apparatus for modifying a video signal.
Figure 15A:
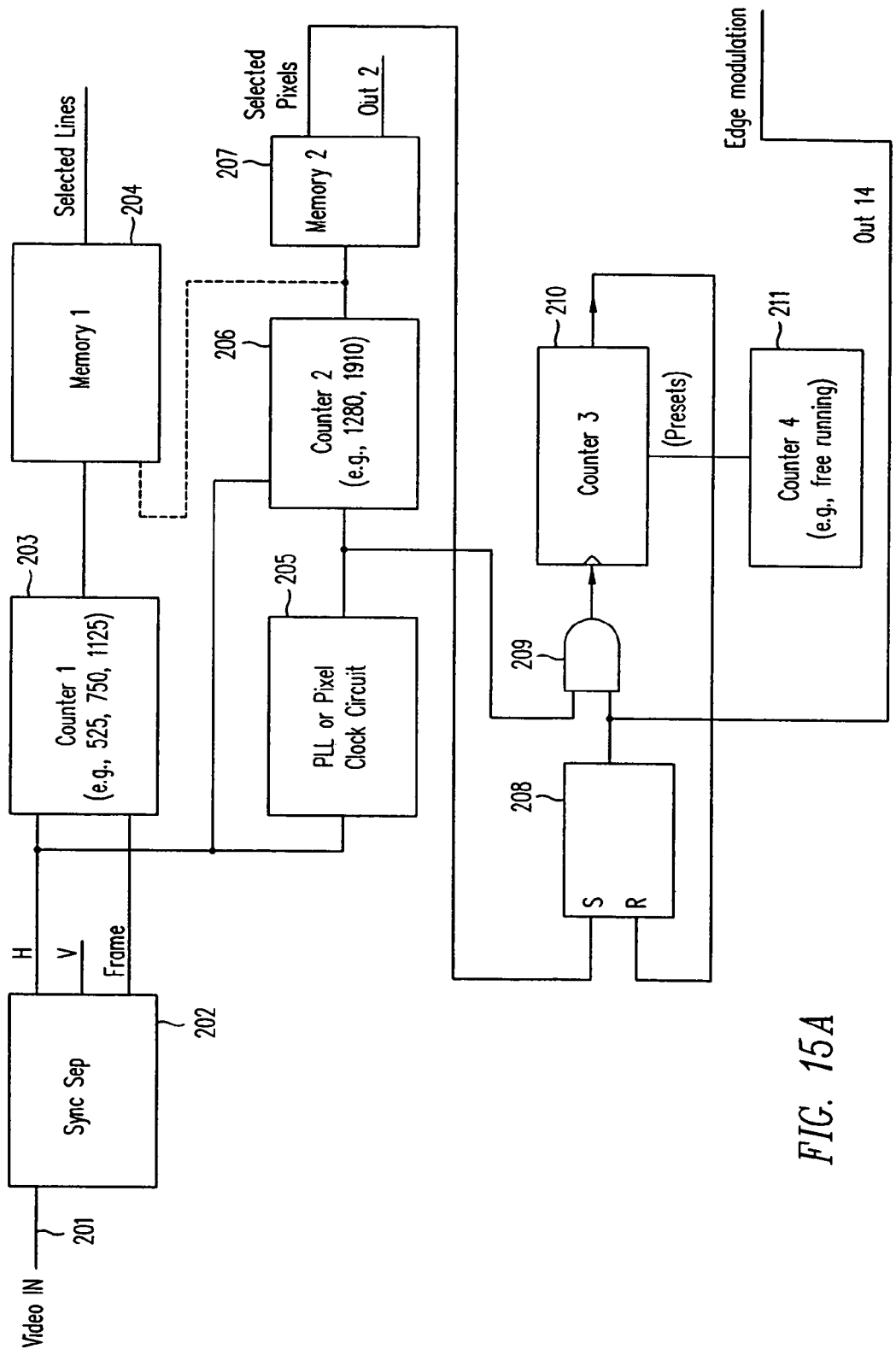

FIG. 15A shows a block diagram of part of another video signal modification apparatus. Along with the associated circuitry of FIGS. 15B and 15C, position or pulse-width and/or amplitude modulation signals are generated for video signal modification. These different modulated signals may be in the form of any portion of the tri-level sync pulse, tri-level pseudo sync pulse, or signal(s) that follow, such as AGC pulses (added positive-going pulses) or lowered/raised back (or front) porch regions. In FIG. 15A, an incoming video signal "video In" is coupled at input terminal 201 to a conventional tri-level sync pulse sync separator circuit 202, which outputs a horizontal rate pulse (H) and a frame pulse (frame). These two output signals are coupled to a first counter circuit 203, which then counts scan lines for the particular TV standards such as 525, 625, 750, and/or 1125 lines per frame or field. Note that 720p actually has 750 scan lines because the "720" refers only to the active video scan lines, that is not counting the VBI lines. Similarly, 1080i actually has 1125 scan lines since the "1080" refers only to the active video scan lines, not counting the VBI scan lines. The output signal of counter circuit 203 is then coupled to the input terminals of a first memory circuit 204. First memory circuit 204 is programmed to output a high logic level for each selected line (e.g., each selected video scan line to be modified).

The output horizontal rate signal (H) from sync separator 202 is coupled to a phase locked loop or pixel clock circuit 205, which generates a frequency that is preferably some multiple of the horizontal line frequency H. This pixel clock circuit 205 is preferably locked to the incoming video In signal. The output of the pixel clock circuit 205 and the horizontal line signal (H) are coupled to second counter circuit 206 that generates address bits for second memory circuit 207. One of the output signals of second memory circuit 207 is a pulse timed to a particular pixel of the scan line. This output signal is coupled to a programmable digital timing circuit including circuits 208, 209, 210, and 211. The SET (S) input terminal of set-reset flip flop 208 starts the beginning of a pulse as defined by second memory circuit 207. AND gate 209 gates through pixel frequency pulses to third counter circuit 210. Depending on the preset signals applied to counter circuit 210, the duration of the timing is established. Fourth counter circuit 211 provides the preset values for circuit 210. Fourth counter circuit 211 may provide a static or set number or a varying set of numbers (e.g., numbers counting up and/or then counting down to return to an arbitrary number). The output signal of flip flop circuit 208, at terminal Out 14, is then a pulse of a defined duration or of a varying duration.

By combining the signal at the terminal Out 14 with the signal at the output terminal Out 2 of second memory circuit 207 via logic 212 (see FIG. 15B) a pulse with leading (and/) or trailing edge modulation is achieved via output terminal Out 22. Coupling the output signal of logic 212 via the signal on terminal out 22 to a timing generator 213, a position modulated pulse (as shown graphically) is provided at output terminals Out 23 or Out 24.

Figure 15C:
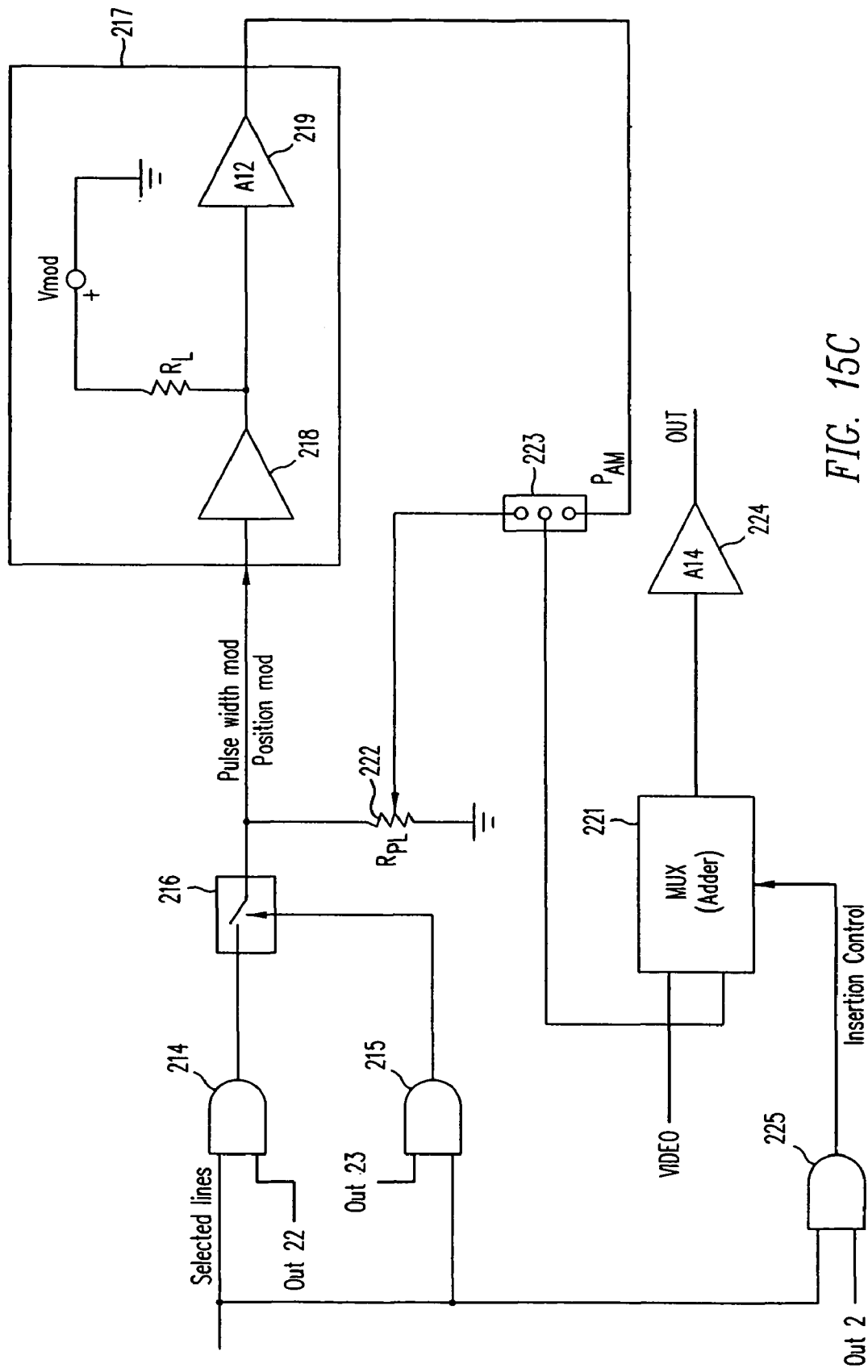

FIG. 15C shows circuitry associated with that of FIG. 15A to receive a pulse-width or position modulated signal, and using AND gates 214 or 215 to place this modulated signal in selected scan lines. Switch 216 as controlled by the output signal from AND gate 215 to switch the output signal from AND gate 214 then determines a pulse width modulated or position modulated signal of selected pixels of selected scan lines to be coupled via level control (variable resistance) 222 to multiplexer (adder) circuit 221. (Circuit 221 is an adder or multiplexer or combination thereof.) Adder circuit 221 also receives an insertion control signal from AND gate 225, which controls insertion for selected pixels of selected lines. As an option, further (amplitude) modulation of the pulse-width or position modulated signal is achieved via amplitude modulator circuit 217. In modulator circuit 217, a logic level signal is coupled in via buffer (amplifier) 218. Buffer 218 may have an open collector or open drain output such that, via a load resistor $R_L$ and voltage source Vmod, it determines the output signal amplitude. Buffer amplifier A12 219 is coupled to receive this amplitude modulated signal and the output signal of amplifier 219 is then coupled optionally to multiplexer/adder circuit 221 for an amplitude modulated signal that is inserted into the video signal. Optionally, amplifier A14 224 then produces an output signal with program video with the inserted or added modifications. The input signal from terminal Out 2 controls this via AND gate 225 Elements Vmod, $R_L$, 219, and 218 and 219 are an example of an amplitude modulator circuit 217. By varying the voltage of source Vmod, the signal or pulses output from switch 216 are amplitude modulated/adjusted. Note that signal source Vmod may output any type of signal, including a DC signal.

Figure 16:
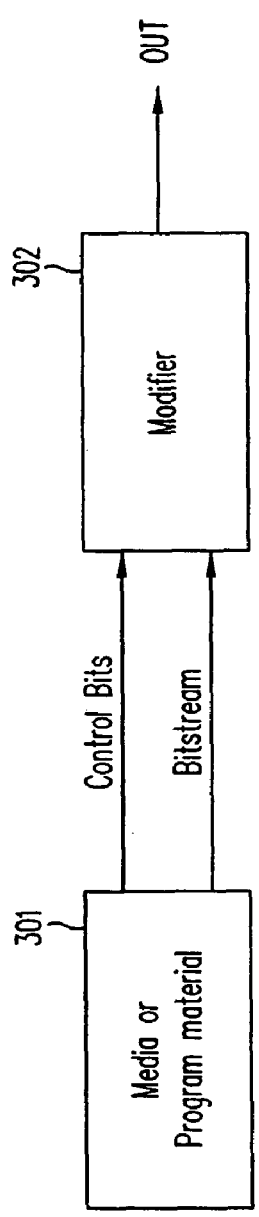
FIG. 16 shows a modification to the video signal incorporating control bits.

FIG. 16 shows (without detail) a system for content control or copy protection where a video source 301 such as a video tape player or DVD player or other source of a distributed or broadcast video program may provide video signal to carry video content which also includes control data to apply one or more types of modification to the resulting output digital bit stream or analog signal at the modifier 302 terminal OUT. For a DVD player or computer type hard disk drive media source 301, the content control or copy protection is applied via modifier 302 to the video control program control data bits or bitstream from video source 301.

Figure 17:
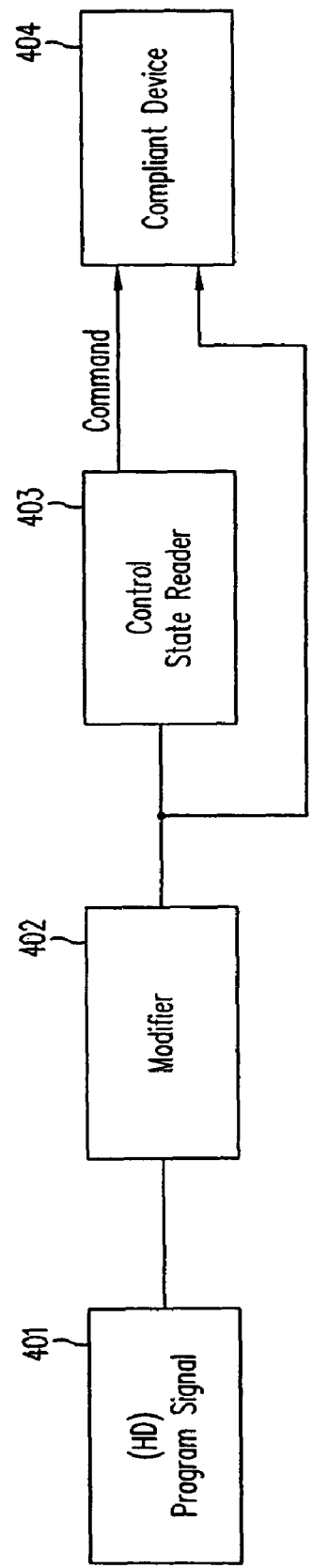
FIG. 17 shows a content control system, in which at least one of the present signal modifications is used.

FIG. 17 shows another such system for content control or copy protection. More particularly, a control state reader 403 interprets the video originated from HDTV program signal source 401 and as modified by modifier 402 and generates a command to a compliant HDTV device 404. Reader 403 may interpret a number of pulses present on selected scan lines of incoming video as a particular command, or it may interpret any position shift/modulation, amplitude level, amplitude or level shift/modulation, or pulse-width or pulse width modulation as a way to convey information (commands) for content control. For instance, if certain positive pulses of tri-level sync pulse are narrowed, the sequence between normal and narrowed positive going pulses for tri-level sync pulses may define a control command. Or, if AGC pulses (added and non-standard positive going pulses) are pulse-width modulated, the width of selected AGC pulses may also define a command. Furthermore, the frequency of the tri-level pseudo sync pulses may also define a command.

In FIG. 17, the compliant receiving device 404 may be a video recorder, display, or interface device (e.g., a WiFi transmitter, or a video to USB/DVI converter). These compliant devices may be designed to respond to a particular modification signal. For instance, a signal that is to be distributed but not displayed can have a modified signal at the source 401 such that it affects compliant displays 404 but not other receiving devices. For instance, a WiFi transmitter may set its clamp pulse at the beginning of the tri-level sync pulse back porch, whereas the display device may be sensitive to the entire back porch. By modifying the video signal at modifier 402 to have raised back porches in the active field and at the last half of the back porch, there would be no problems of transmission by this WiFi transmitter, but there would be severe darkening effects on the display device, resulting in the desired copy protection effect.

Also, the receiving compliant device 404 may operate in a fashion that is bi-directional. For example, the compliant device 404 may send an identifier signal back to the video source 401, such as a (DVD) media player. By recognizing which compliant devices are allowed to operate (or by recognizing restrictions set upon particular compliant devices), the media itself or media player 401 can apply signal modifications to affect receiving devices 404 in a more independent manner such as not allowing transmission, but allowing display, or allowing recording for a set duration.

Defeating/Reducing/Modifying Effects of the Modifications

High definition TV signals (or other video signals containing tri-level sync pulses) that have been altered with content control tags/signal or copy protection signals added or inserted as described above, can later (presumably by a different entity) be modified further to change the result of the control signals or tags, and/or modify at least an effect of copy protection signals. In the following description, "tags" may be or include an HDTV CGMS signal, a back porch signal, a front porch signal, a set of selected lines of sync pulse modification (which may include sync deletion in part or in whole), any AGC pulse, any (type of) tri-level pseudo sync signal, a signal inserted or added to selected pixels in one or more TV lines, and or data signal. The tags carry content control commands. In one embodiment, the reference signals, such as tri-level sync signals, may be modified to alter at least an effect or command of the content control.

Note that any such defeat or reducing effect activities or apparatus may be illegal in the U.S. under the Digital Millennium Copyright Act (DMCA) as being intended to make or enable making of unauthorized copies. Hence the following is a technical disclosure, but not intended to induce, encourage or enable any unlawful activity.

For example, if tags or raised back porch signals are inserted for purposes of content control, tri-level sync pulses prior to them may be used by the receiving device to locate the back porch signals. By modifying one or more tri-level sync pulses such as by deleting, position shifting, attenuating, narrowing, and/or level shifting a sufficient portion of selected tri-level sync pulses, then at least one of the inserted back porch signals may not be detected correctly. One can also add a signal to an area or a duration of selected tri-level sync pulse which would then cause an erroneous detection or sync separation of at least a tri-level sync pulse needed to correctly detect a back porch signal. Also in this example, for video which contains tri-level sync pulses, at least a portion of the tag signal or copy protection signal may undergo position shifting, level shifting, narrowing, attenuating, and or deleting. At least a portion of a tag may also have a signal (e.g., interfering signal) inserted or added so as to cause an erroneous detection (e.g., by the receiving device).

In another embodiment, at lease one of the tags is relocated (e.g., the tag may (also) be relocated relative to a sync signal such as a tri-level sync pulse or a vertical sync pulse or signal). For example, if there are ten possible scan line locations of tags, and five of them are used and clustered near a particular scan line, one can change the location of at least one tag to another location. To further illustrate, suppose the tags are back porch pulses located on scan lines 10, 11, 12, 13, and 14, but tags can be located from scan lines 10 to 19. The relocated tags are as in the following example: scan lines 10, 11, 13, 14, and 19. Of course, other examples of relocation are possible. In yet another embodiment, simply modifying at least a portion of a vertical sync pulse so as to cause the compliant device, for example, to misidentify the proper scan line count could throw off the scan line assignments of the tags. For example, if one were to delete the first broad vertical sync pulse and add a broad pulse after the last standard (normal) vertical sync pulse, the scan line count will be off by one count. The scan line count error may cause tags and/or HDTV CGMS signals to be improperly detected. Another example is to modify in an interlaced system the field identification. This field identification alteration can be done by modifying a portion of a vertical sync signal and or horizontal sync signal in one or more VBI. Thus, a data signal associated with a particular field (e.g., odd or even), is assumed to be in another field (e.g., even or odd) because a content control system relies on correct sync signals for locating the data signal. Another way is to just move the data signal to another field, since it is the relative location between data and field or sync signal that determines a correct or incorrect read in a content control system.

Figure 18:
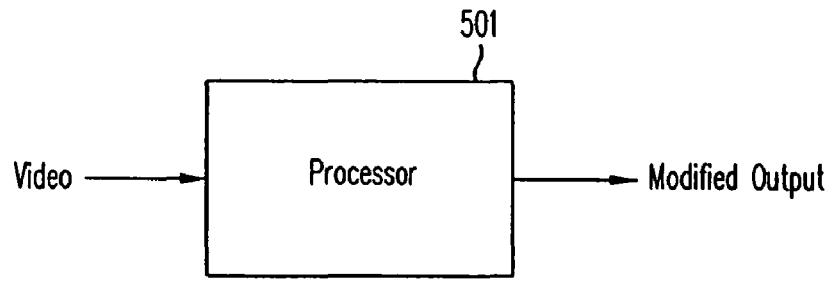
FIG. 18 shows a processor for defeating/reducing the effects of a content control or copy protection, as do FIGS. 19, 20, and 21.

FIG. 18 shows (without detail) a processor device 501 for receiving an incoming video signal (or video bit stream) that already has a content control or a copy protection signal added, as described above. Processor 501 then modifies the incoming video signal (or bitstream) to change the content control command (for a compliant device, for example) or to modify an effect of a copy protection signal (that is, reduce or eliminate copy protection to produce the modified output video). One example of processor 501 would be used with a video signal as described above that has tri-level sync pulses and some associated added or deleted pulses. In the case where the content control signal is based on a deleted selected tri-level sync portion, processor 501 may regenerate the deleted tri-level sync portion. In yet another case whereby the input video signal, a bit stream, contains pixel bits added for content control, processor 501 may delete or modify these pixel bits.

Figure 19:
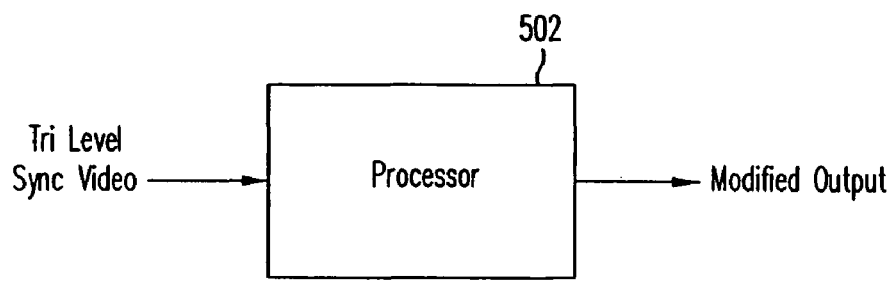

FIG. 19 shows more specifically provision of an input video signal with tri-level sync pulses. This input video signal may be in component form for at least one video channel, and at least one channel has the tri-level sync pulses. Also, the input video signal may have the above-described modifications in its blanking intervals, or some portion of the active video signal modified as described above as to convey content management or to convey a copy protection signal. This input video signal is coupled to processor 502, which processes the modified tri-level sync pulse(s) to output a modified output video signal that changes the content management command or changes or reduces an effect of the copy protection signal. For example, the input video signal, which includes the tri-level sync pulses, has tri-level pseudo sync pulses and/or AGC pulses added. The processor 502 may attenuate or delete any portion of such a tri-level pseudo sync pulse and/or any portion of an AGC pulse. In another example, if the AGC and/or tri-level pseudo sync pulses are modulated, this modulation may be reduced or altered by processor 502 to change the outcome of a copy protection effect or a content management command. A way to change the modulation is to replace various levels of AGC and/or tri-level pseudo sync pulses with a static signal such as at processor 502 using a static AGC pulse or a static tri-level pseudo sync pulse. An example of a static pulse is a fixed position, width, frequency, and/or amplitude signal. For example, a modulated signal whereby its amplitude, frequency, or position is varied in time to convey a content control information signal, or to produce a dynamic copy/display protection signal. By at least reducing the dynamic effects (by transforming this dynamic signal to a more static signal), the commands or copy protection effects are as result modified or reduced.

Figure 20:
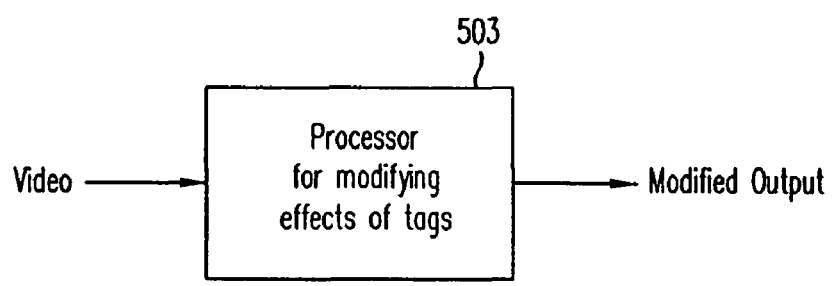

FIG. 20 shows a processor 503 which alters the effects of added tags in the input video. Such a processor may modify a portion of the incoming video signal that is not the tag itself. For example, removing at least a portion of a tri-level sync pulse prior to a tag can cause the tag to not be detected because a compliant device which receives tags may use a standard or detectable tri-level sync signal to locate a following tag. Without the tri-level sync pulse for locating the tag, the tag is not detected by the compliant receiving device (not shown). FIG. 20 also shows that processor 503 can modify at least a portion of the tag itself so as to alter the tag to remove, attenuate, add a signal e.g., interfering signal before or during or after the tag, and/or shift amplitude or position, or the like. Similarly, removing or relocating at least a portion of a vertical sync signal can cause a tag to be misread (e.g., in a compliant device or content control system).

Figure 21:
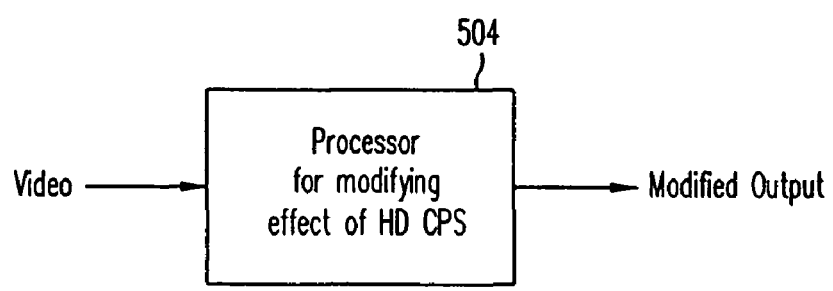

FIG. 21 shows a processor 504 for modifying an effect of an incoming HDTV content protection/video copy protection signal (CPS). Again, modifying the effect may include changing or altering a portion of the video signal outside the content protection or copy protection signal. For example, if incoming video with a tri-level sync pulses is content protected with a data signal (e.g., an HDTV version of CGMS), then simply modifying at least a portion of this data signal's corresponding tri-level sync pulse can cause improper detection of the data signal. Also, modifying the vertical sync signal such as delaying or advancing at least a portion of the vertical sync signal can throw off the correct scan line location of the data signal, e.g., in a receiving device. Adding or inserting a "fake" vertical pulse or signal at a different location can also cause the scan line count for identifying tags or data signals to be erroneous. When adding such a fake vertical pulse or signal, it may be preferable to remove at least a portion of the original vertical sync signal, e.g. for better playability. Furthermore modifying an effect can mean modifying a portion of the content control or copy protection signal. For example, modifying at least a portion of the data signal can cause an improper tag detection or read by the receiving device.

In another example of the FIG. 21 device, the incoming tri-level sync pulse video signal may already be content managed or copy protected via a combination of added tags or data or tri-level pseudo sync pulses or AGC pulses in at least one video channel as described above. Device (processor) 504 then may remove, attenuate, or level shift, or narrow or widen, or position shift any of the above added signals for any video channel for modifying an effect of a content management system or a copy protection signal.

Note that the processors of FIGS. 18, 19, 20, and 21 and others disclosed here may be implemented in any combination of analog circuitry, digital circuitry, software, and or firmware (e.g., executed by a microprocessor or microcontroller or the like).

Figure 22:
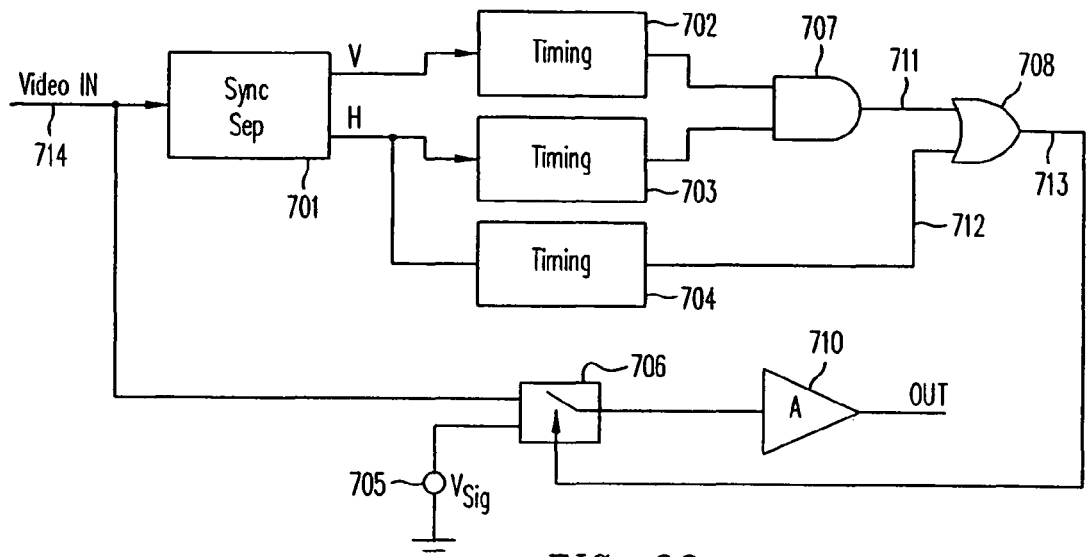
FIG. 22 shows more detail of a processor of the type in FIGS. 18-21, as do FIGS. 23, 24, 25, 26A and 26B.

FIG. 22 shows an example of a block diagram of an apparatus (processor) for modifying content control or copy protection signal(s) as described above. Input video at terminal 714 is coupled to a sync separator 701. A vertical or frame rate signal V and a horizontal line rate signal H are output from sync separator 701. Signal V is coupled to a timing circuit 702, which for example outputs a logic high signal for selected scan lines. Signal H is coupled to a timing circuit 703, which for example, outputs a logic high signal for selected portion or portions of the scan line. The outputs of timing circuits 702 and 703 are logically combined by AND gate 707, which outputs a logic high signal for selected scan lines of selected portion(s) or pixels on line 711. The output of gate 707 then can be a signal for example, that is coincident to at least a portion of one or more tri-level pseudo sync pulses and/or AGC pulses. The horizontal sync pulse signal H is also coupled to timing circuit 704, which provides an output which may be logic high for selected blanking interval(s)

such as the HBI. The output of timing circuit 704 on line 712 is then combined with the output of gate 707 via OR gate 708 on line 713. The output of OR gate 708 on line 713 when actuated then controls a switch 706, which then replaces selected video portions at terminal 714 with a reference signal Vsig.

In one example, reference signal Vsig can be a fixed voltage, and switch 706 replaces any signal (e.g., raised front and or back porch pulse) in the horizontal tri-level sync pulse front and or back porch with the fixed voltage. Also switch 706 may replace at least a video signal region where added pseudo sync pulses and/or AGC pulses reside with the fixed voltage. The resulting output signal OUT via amplifier 710 then has a sufficient portion of content control and/or copy protection signals in the presence of tri-level sync pulses removed or modified to alter the content control command, or to reduce an effect of a copy protection signal. It should be noted that to just remove or modify back porch signals, the output terminal of timing circuit 704 may be coupled directly to switch 706, and then components 707,708,703, and 702 are not required.

Figure 23:
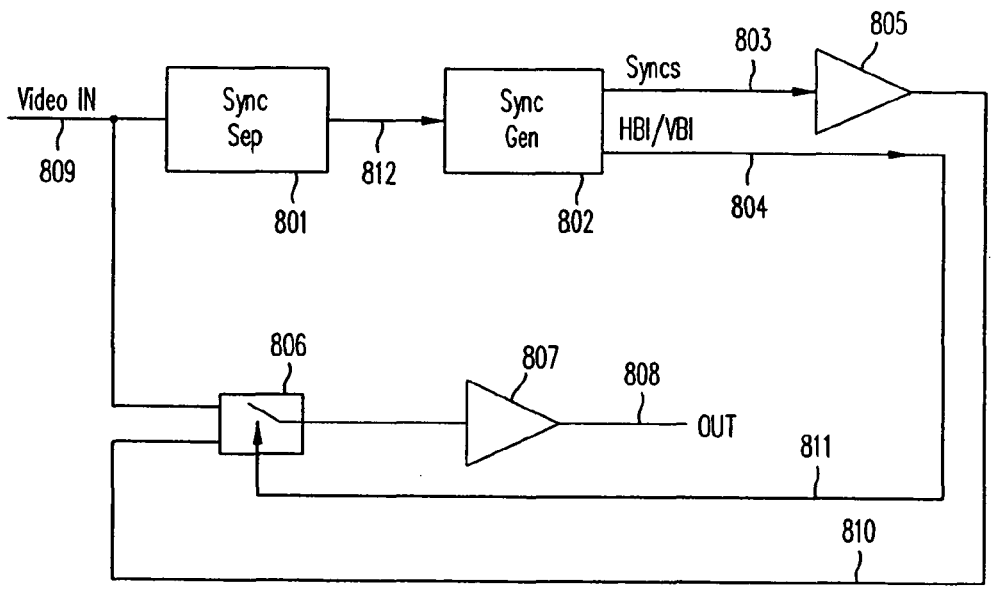

FIG. 23 shows another apparatus for modifying an input video signal (e.g., tri-level sync pulse video) by replacing a portion of the video input signal with regenerated sync pulses or tri-level sync pulses. Certain portions of the incoming video VBI and/or HBI may also be replaced. For example, if the video input signal contains selected tri-level sync pulses that are non-standard, such as asymmetrical negative/positive tri-level sync pulses, the FIG. 23 apparatus will replace the incoming altered tri-level sync pulses with substantially normal ones. Also, for example, if the incoming video signal has added signals following selected tri-level sync pulses, the FIG. 23 apparatus replaces (at least a portion of) such added signals with a signal such as a blanking level. Furthermore, if the incoming video signal has added tri-level pseudo sync pulses followed by AGC pulses, the FIG. 23 apparatus will replace at least a portion of these added signals with a more normal signal such as a blanking level. If the incoming video signal has selected tri-level sync pulses (or a tri-level sync pulse portion) deleted for purposes of content control, then the FIG. 23 apparatus replaces one or more of the missing tri-level sync pulses (or missing tri-level sync portions); for example, it thereby causes a change in the content associated control command.

In FIG. 23, the incoming video signal at terminal 809 is coupled to sync separator circuit 801. The output of sync separator 801 is then coupled via line 812 to a sync generator circuit 802, which substantially locks to the sync separator 801 output signal. For example, the output of sync generator 802 on line 803 then has the proper (standard) sync signal such as standard tri-level sync pulses for 720p or 1080i HDTV. The other output of sync generator 802 on line 804 provides pulses indicative of the HBI and/or VBI. A standard sync signal output from the sync separator 802 on line 803 is coupled to amplifier 805, which delivers a correct sync pulse level for a video signal on line 810. Switch 806 then receives the HBI/VBI pulses from generator 802 on its control terminal to switch into the incoming video at least a portion of the regenerated (substantially) standard sync from amplifier 805. The output from switch 806, via amplifier 807 at output terminal 808, then has the incoming video modified, from non-standard sync pulses to now a video signal with fewer or no non-standard sync pulses. If the input video had non-standard signal levels in the HBI (e.g., a front or back porch pulse or non-standard tri-level sync pulses), the output signal at terminal 808 is video more free of these non-standard (VBI or) HBI signals. For example, a standard HBI signal may contain front and back porch levels at a standard reference such as blanking level for the Y channel or about 0 volts for the Pb or Pr channel, along with (a more) standard tri-level sync pulses for the Y, Pb, and Pr channels.

FIG. 24 shows another apparatus to modify a video content control or copy protection signal. For example, if there is an added signal following a tri-level sync pulse, this apparatus attenuates the added signal. Thus for example the content control signal may be misread or a copy protection signal may be reduced in effectiveness, e.g. easier to copy or distribute, or effect, e.g. easier to distribute or to view. Video signal input at terminal 1004 is coupled to a sync separator 1001 and the horizontal rate pulses H from the sync separator 1001 are coupled to a timing circuit 1002. The output of timing circuit 1002 includes a signal coincident to at least a portion of the video signal. This portion of the video signal may be portion of the HBI and/or a portion of the active video scan line. Switch 1003 receives the output signal from circuit 1002 and thus controllably shunts the video input (via resistor 1005) to an AC ground, preferably via a low impedance. Switch 1003 can be an analog switch or a transistor or a solid state device or an active device, similar to the other switches disclosed here. Note that switch 1003 may be coupled to the output terminal 1010 with a conventional filter capacitor. FIG. 24 thus shows a way to use attenuation on at least a selected portion of the video signal to alter an effect or command of a content control signal or to modify an effect of a e.g., tri-level sync pulse video copy protection signal. In an example whereby a tag signal or copy protection or display protection signal generally causes some displays to show a less than normal picture, the attenuation method such as in FIG. 24 may reduce clamp errors for certain displays. With out an attenuation method such as FIG. 24, unauthorized display or distribution would not be allowed.

FIG. 25 shows a somewhat similar apparatus that replaces a portion of the incoming video signal with a signal to alter or defeat or reduce an effect of a content control signal or a copy protection signal. For example, a tri-level sync pulse video input signal at terminal 1004 is coupled to a sync separator 1001 and a DC restoration circuit 1009. The output signal of the sync separator 1001 is coupled to timing circuit 1002. The timing circuit 1002 outputs a pulse coincident with at least a portion of the content control signal or the copy protection signal. DC restoration circuit 1009 allows the blanking level to be substantially constant, with dynamic average picture levels. The output signal of the DC restoration circuit 1009 is coupled to one input terminal of switch 1003, while a reference voltage source VRef is coupled to the other input terminal of switch 1003. The output signal of switch 1003 then has at least a selected portion of the incoming tri-level sync pulse video signal replaced with the reference voltage. The output of amplifier 1007 at terminal 1010 then is a tri-level sync video pulse signal that has a modified content control signal or a copy protection signal. For example, this modification by replacement reduces an effect of the copy protection signal or alters a command of the content control signal. (Vref may be an AC or DC signal or waveform.)

The apparatus of FIGS. 24 and 25 can be also used to narrow at least a portion of the added signals in the HBI. For example, if the timing circuit 1002 generates a pulse that is coincident with just a portion of the duration of back porch pulse, the effect on the output signals at output terminal 1010 will be a narrowed back porch pulse. In another example, if the timing circuit 1002 provides a pulse or pulses at one or more portion of the back porch pulse, then the back porch pulse may be split into two or more narrowed pulses. This splitting will alter at least an effect of the content control or copy protection signal.

Figure 26A:
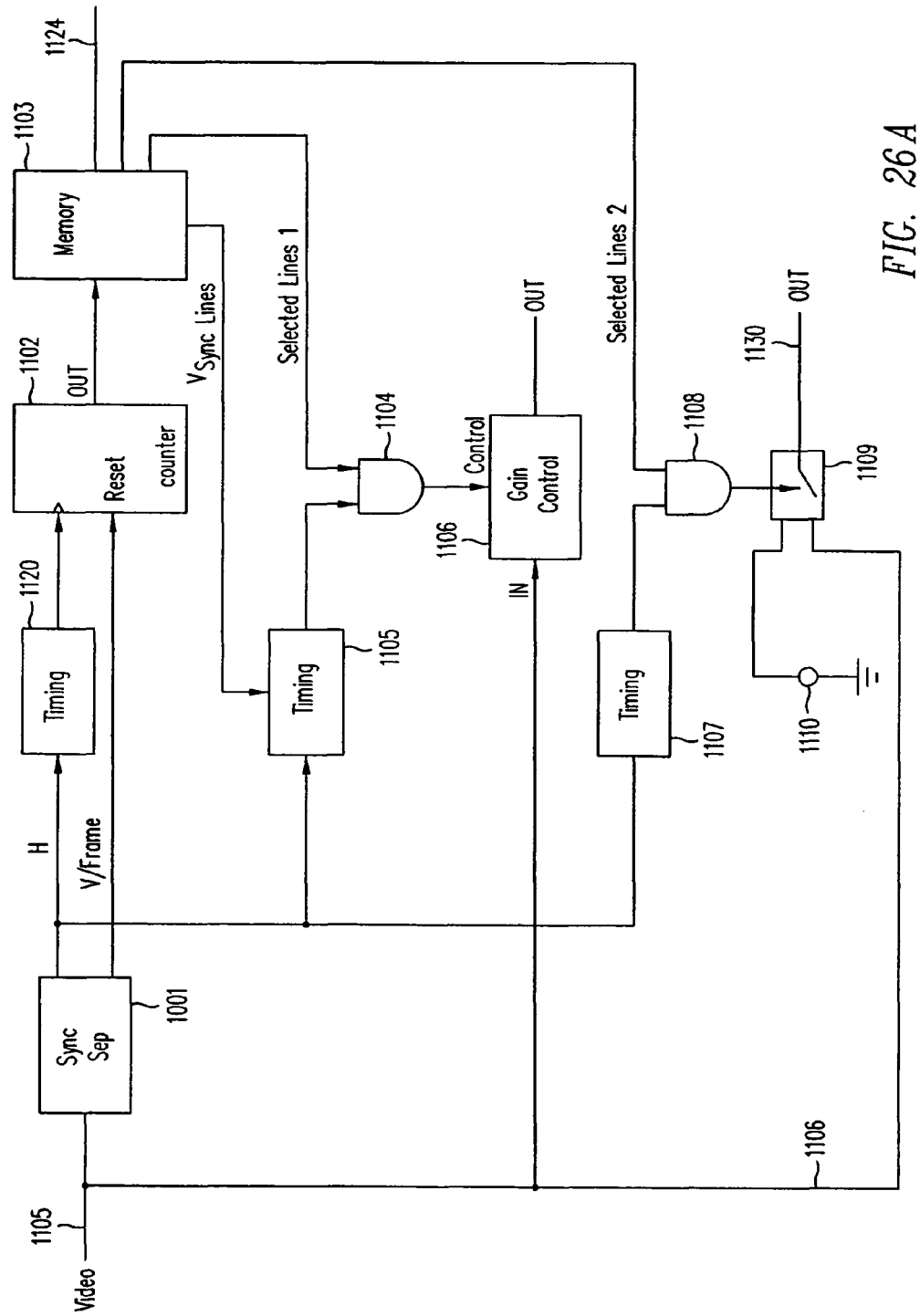

FIG. 26A shows an apparatus using gain control and/or narrowing to alter an effect of a content control signal or a copy protection signal. The incoming video at terminal 1105 is coupled to a sync separator 1001. One output terminal of the sync separator 1001 supplies a horizontal rate pulse H, which is coupled to a timing circuit 1120. The output signal of circuit 1120 is a horizontal rate pulse that, for example, can start before a sync pulse, and this horizontal rate pulse from circuit 1101H is coupled to a counter circuit 1102. Counter circuit 1102 also receives a Reset frame (Frame) or vertical pulse (V) from the sync separator 1001. The output terminals of counter 1102 are coupled to address input terminals of a memory circuit 1103. In one embodiment, selected portions of the incoming video signal are effectively increased in amplitude relative to other portions of the video signal, to cause detection of normal sync signals while causing tri-level pseudo sync pulses to be undetected or not sensed. Thus the "Selected lines 1" and the "Vsync lines" output signals from memory 1103 are coupled respectively to input terminals of AND gate 1104 and timing circuit 1105. Timing circuit 1105 also receives a horizontal rate (H) pulse from the sync separator 1001 to generate a pulse coincident with at least some (or all) of the tri-level sync pulses. AND gate 1104 also receives from memory circuit 1103 the "Selected lines 1" output signal. The output of timing circuit 1105 will also generate a pulse coincident with one or more vertical sync pulses coupled to AND gate 1104. AND gate 1104 then outputs a pulse to gain control circuit 1106 that is logic high for the presence of standard sync pulses and generally logic low for the presence of pseudo sync pulses. With gain control circuit 1106 controlling at least a portion of the tri-level sync pulse video signal, a set of standard sync pulses are generally increased over a set of pseudo sync pulses at the output terminal out of gain control circuit 1106. By generally increasing the amplitude of at least some selected standard (tri-level) sync pulses (e.g., relative to pseudo sync or tri-level pseudo sync signals), at least an added tri-level pseudo sync (or pseudo sync) pulse will not be sensed reliably, thereby causing a change in the content control command or effectiveness or a change in copy control/copy protection effectiveness/effect(s).

The apparatus of FIG. 26A also narrows or deletes a portion of (added) tri-level pseudo sync pulses and/or AGC pulses. Timing circuit 1107 receives the horizontal rate pulse H from the sync separator 1001 and generates a signal that is coincident with at least a portion of tri-level pseudo syncs and/or AGC pulses. Memory circuit 1103 generates a signal "Selected lines 2" indicative of at least a scan line where tri-level pseudo sync pulses are located. AND gate 1108 logically combines the output signal from timing circuit 1107 and the "Selected lines 2" signal from memory 1103 to generate a signal coupled to control switch 1109 coincident with at least a portion of the tri-level (sync or) pseudo sync value and/or AGC pulse. Switch 1109 thereby inserts a signal from voltage source 1110 in the selected portion(s) of the tri-level pseudo sync (or sync) pulse and/or AGC pulse. One example of the resulting signal on output terminal 11030 is a narrowed duration of at least a tri-level sync (or pseudo sync) and/or of an AGC pulse. Another example of the resulting signal on output terminal 1130 is a deletion of sufficient number or portions of tri-level sync (or pseudo sync) and/or AGC pulses to alter a content control signal command or to reduce an effect of a copy protection signal.

FIG. 26B (a continuation of FIG. 26A) shows two examples for adding a signal for defeat (e.g., reducing an effect) or modifying purposes to at least a portion of the content control or copy protection signal. An output signal of the sync separator 1101 is coupled at terminal 1150 to a timing circuit 1118, the output of which is then coupled to an input terminal of AND gate 1119. Timing circuit 1118 for example generates a signal indicative of at least a back porch (or front porch) portion and/or an active portion, or a location where tri-level pseudo sync pulses reside. Memory circuit 1103 outputs a signal designated "Selected lines 3" on its output terminal 1124 coupled to AND gate 1119. The output signal of gate 1119 is a signal indicative of at least added pulses in the HBI (e.g., front and or back porch signals) and/or added signals in the VBI or the vicinity of a VBI (e.g., tri-level pseudo syncs and or AGC pulses). Scaling factor circuit 1117 (scaling by a factor K) translates the logic level output signal of gate 1119 to a video level signal, which is then coupled to a summing circuit 1116. The other input to summing circuit 1116 is the incoming video from gain control 1106 at terminal 1152. Thus, the output of summing circuit 1116 at terminal 1134 is a video signal, whereby a level shifting signal has been added to a portion of the incoming video signal. The level shifting thus changes levels of any portion of the added signal. This level shifting can (also) cause level shifting of at least a portion of selected tri-level sync pulse(s) and/or vertical sync pulse(s), which for example, can lead to the misdetection of a back porch signal or an HDTV CGMS signal.

Yet another output signal of the apparatus of FIG. 26B, at output terminal 1132 adds at summing circuit 1115 (via switch 1136) a reference signal from voltage source 1112 (or voltage source 1113) to the already summed video signal so as to interfere or level shift or distort at least a portion of the content control or copy protection signal, or a selected portion of tri-level sync pulses or vertical sync pulses. This adding results in altering a command of the content control signal or in reducing an effect of the copy protection signal. Normally the voltage from source 1113 is set to zero, but source 1113 may provide a signal voltage to add a different waveform to the incoming video signal when source 1112 is not switched in. The voltage from source 1113 for example may be a pedestal voltage to selected active field lines e.g., a pedestal voltage to "brighten" a signal that would normally be dark due to the content control or copy/display protection signal.

Figure 27A:
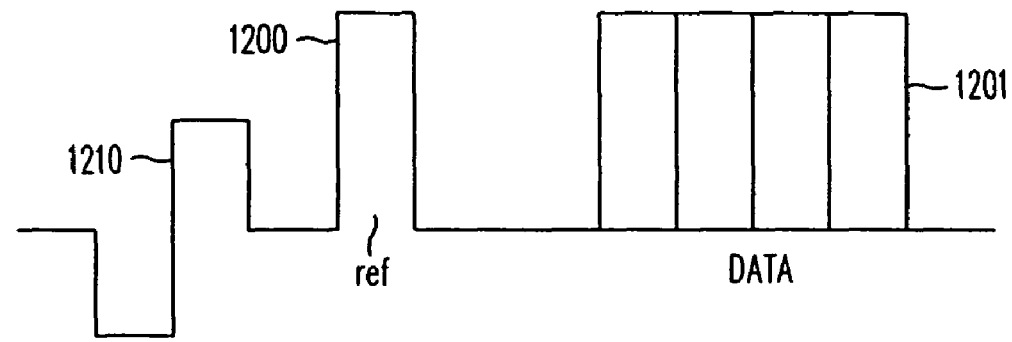
FIG. 27A shows a prior art data or content control signal.
Figure 27B:
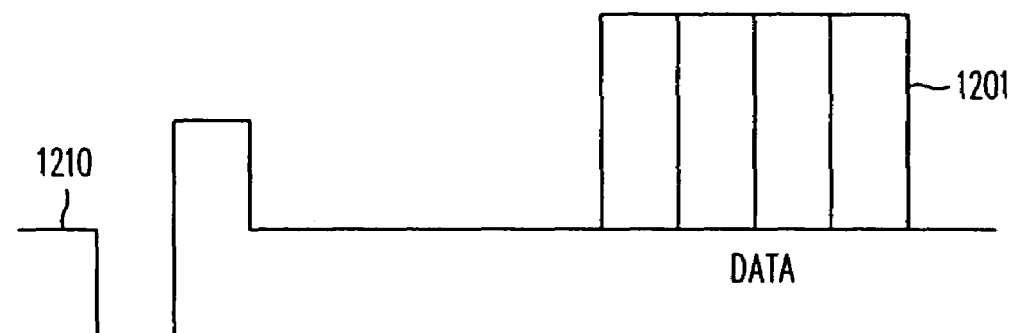
FIGS. 27B and 27C show waveforms with modifications of the prior art signal that alters a content control command.
Figure 27C:
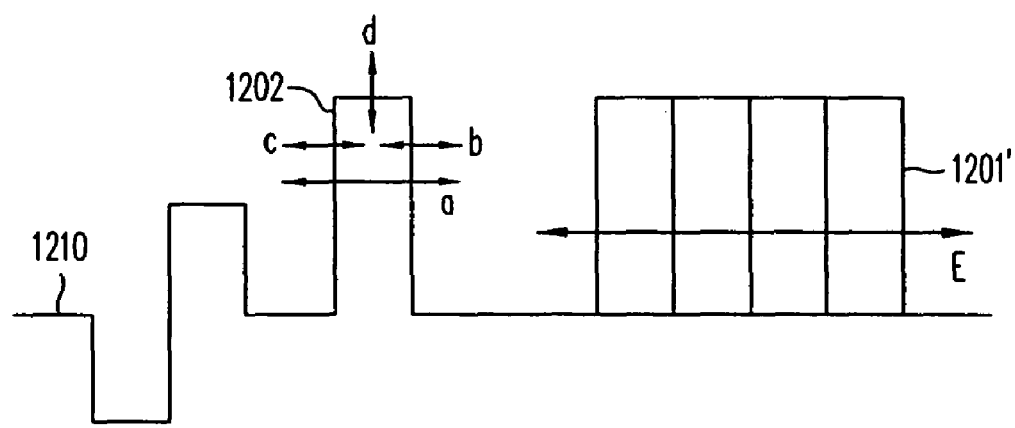

FIG. 27A illustrates a waveform of a data signal associated with a tri-level sync pulse. This data signal may be an HDTV CGMS signal, for example. Tri-level sync pulse 1210 is present before the data signal. A reference signal 1200, e.g. a start pulse or a packet of bits or cycles, and the data bits 1201 make up the data signal. FIG. 27B illustrates a defeat waveform intended for causing a misread of the data bits 1201 of FIG. 27A by modifying the reference signal 1200, where in FIG. 27B, reference signal 1200 is attenuated or deleted. Only a sufficient portion of the reference signal 1200 needs to be so modified to achieve the desired effect. Also, such a misread of the data bits can also be accomplished by modifying e.g., modulating, attenuating, removing, or narrowing or edge(s) shifting or serrating or moving or the like at least a portion of the reference signal 1202 as shown in FIG. 27C by superimposed arrows a, b, c, d. FIG. 27C also shows yet another way to cause a misread on data bits 1201' by altering any portion of the data bits 1205 via narrowing, compressing, level changing, position shifting, and or expanding as indicated by superimposed arrow E. Also, this type of altering will likely result in changing the command conveyed by the data bits.

In yet other embodiments for example, content control (for HDTV or non HDTV) may incorporate the use of multidirectional (e.g., bi-directional) communication(s) or link(s). A link would be able "tell" a content control system the type of device being used, and the content control system may output an appropriate content control or device management signal. The content control system may also direct the device to send out a signal modification to another device to yet another layer of content control or content protection. Embodiments thus may include any combination of adding or inserting of signals, or deleting, to selected pixels of an HDTV signal. Yet another embodiment is a content control system in a computer-like network situation, whereby one or more sources/devices are sensed and appropriate signals or commands are sent via the network to allow for flexible content control or content protection of the various devices.

It should be noted that for some content control or copy/display protection signals, extra signal enhancement(s) may be used such as those described (for analog TV) in Wonfor et al. U.S. Pat. No. 5,583,936. incorporated herein by reference in its entirety. These types of signal enhancements may be made, in accordance with this disclosure, part of the overall HDTV signal. These signal enhancements can cause a more effective HDTV copy or display protection process or simply be part of a copy or display protection signal. For example, if some of the embodiments here cause an AGC reaction, the enhancements may increase or modify the effects or effectiveness. If some of the embodiments cause a display to produce a generally unviewable picture (e.g., via clamp errors in a display device or video interface unit), the enhancements may cause a more unviewable picture. Therefore, a signal modification enhancement as in U.S. Pat. No. 5,583,936 may insert modulated signals to HDTV lines in the bottom or top portion of the TV field to cause increased loss in entertainment value (e.g., such as more tearing or instability on an HDTV display or more noise/interference on an HD device). The enhancement method of U.S. Pat. No. 5,583,936 may also be adapted for HDTV as any combination of blanking a portion of selected lines, adding a signal to selected line portion or portions, deleting, or narrowing or attenuating to a portion in the HBI or VBI or selected pixels of an HDTV signal. Also, defeating or reducing or modifying effects methods as disclosed in U.S. Pat. No. 5,583,936 are applicable in the HDTV context (e.g., with content control signals or copy/display protection signals) as well.

This disclosure is illustrative but not limiting; further modifications will be apparent to one skilled in the art in light of this disclosure and are intended to fall within the scope of the appended claims.

What is claimed as new and desired to be protected by Letters Patent of the United States is:

1. A method of modifying a video signal to control use of the video signal, comprising the acts of:
   receiving a video signal generally conforming to a digital television standard; and
   modifying a portion of the video signal associated with at least one tri-level synchronization pulse in a horizontal blanking interval in selected scan lines of the video signal by adding at least one positive going pulse to a front or back porch of the horizontal blanking interval, whereby the modified video signal is readily displayed and viewed on a display device without being further processed, and the number of positive going pulses per set of scan lines defines content control information controlling subsequent use of the video signal and indicating a selected one of a set of at least three commands.

2. The method of claim 1, wherein the modifying occurs in at least one of the luma or chroma channels of the video signal.

3. The method of claim 1 wherein the modifying varies between the selected scan lines of the video signal.

4. The method of claim 1, wherein the added pulse extends into an active video portion of the associated scan line.

5. The method of claim 4, wherein the active video portion is an overscan portion of a field of the video signal.

6. The method of claim 1, wherein the act of modifying includes adding the pulse in at least one of the luma or chroma channels of the video signal.

7. The method of claim 1, wherein the added pulse further has a portion which is negative going.

8. The method of claim 1, wherein the added pulse has a configuration of the tri-level synchronization pulse.

9. The method of claim 1, wherein the act of modifying includes adding a plurality of positive going pulses to the blanking interval.

10. The method of claim 1, wherein the act of modifying includes adding a positive going pulse to a plurality of the blanking intervals, a character of the added pulses varying between the scan lines of the video signal.

11. The method of claim 10, wherein the character that varies is at least one of a position, amplitude, width, or number of the added pulses.

12. The method of claim 1, wherein the added pulse is a gray level pulse and is added to the back porch.

13. The method of claim 1, wherein the added pulse has a duration one third to double that of the tri-level synchronization pulse.

14. The method of claim 1, wherein the digital television standard is a high definition television (HDTV) standard.

15. The method of claim 1, wherein the standard is one of 720 line progressive scan (720p) or 1080 line interlaced (1080i) scan.

16. The method of claim 1, wherein the modified portion at least in part defines a predetermined command for content management of the video signal.

17. The method of claim 1, wherein the modified portion inhibits subsequent recording of the video signal by causing a sensing system in an apparatus receiving the video signal to produce an erroneous output.

18. The method of claim 1, wherein the modified portion is in at least two channels of the video signal.

19. The method of claim 18, wherein modifications to the modified portion of the video signal differ between the two channels of the video signal.

20. A method to control use of a video signal comprising the acts of:
   receiving a video signal generally conforming to a digital television standard and having tri-level synchronization pulses associated with horizontal blanking intervals of scan lines of the video signal and being readily displayed and viewed on a display device without being further processed, a portion of the video signal associated with at least one tri-level synchronization pulse being modified by having at least one positive going pulse added to a front or back porch of the horizontal blanking interval;
   wherein the number of added positive going pulses per set of scan lines at least in part defines a predetermined command selected from one of a set of at least three predetermined commands; and
   controlling subsequent use of the video signal in accordance with the command.

21. The method of claim 20, wherein the modified portion occurs in at least one of the luma or chroma channels of the video signal.

22. The method of claim 20, the modification varying between scan lines of the video signal.

23. The method of claim 20, wherein the added pulse extends into an active video portion of the scan line.

24. The method of claim 23, wherein the active video portion is an overscan portion of a field of the video signal.

25. The method of claim 20, wherein the added pulse is in at least one of the luma or chroma channels of the video signal.

26. The method of claim 20, wherein the added pulse further has a portion which is negative going.

27. The method of claim 20, wherein the added pulse has a configuration of the tri-level synchronization pulse.

28. The method of claim 20, wherein the modified portion includes a plurality of positive going pulses added to the horizontal blanking interval.

29. The method of claim 20, wherein the modified portion includes a positive going pulse added to a plurality of the blanking intervals, a character of the added pulses varying between the scan lines of the video signal.

30. The method of claim 29, wherein the character that varies is at least one of a position, amplitude, width, or number of the added pulses.

31. The method of claim 20 wherein the added pulse is a gray level pulse added to the back porch.

32. The method of claim 31, wherein the added pulse has a duration one third to double that of the tri-level synchronization pulse.

33. The method of claim 20, wherein the digital television standard is a high definition television (HDTV) standard.

34. The method of claim 20, wherein the standard is one of 720 line progressive scan (720p) or 1080 line interlaced (1080i) scan.

35. The method of claim 20, wherein the predetermined command is for content management of the video signal.

36. The method of claim 20, wherein the modified portion inhibits subsequent recording of the video signal by causing a sensing system in an apparatus receiving the video signal to produce an erroneous output.

37. The method of claim 20, wherein the modified portion is in at least two channels of the video signal.

38. The method of claim 37, wherein modifications to the modified portion of the video signal differ between the two channels of the video signal.

39. Apparatus for modifying a video signal, comprising:
an input port adapted for receiving a video signal generally conforming to a digital television standard;
a processor coupled to the input port and modifying a portion of the video signal associated with at least one tri-level synchronization pulse in a horizontal blanking interval in selected scan lines of the video signal by adding at least one positive going pulse to a front or back porch of the horizontal blanking interval, whereby the modified video signal is readily displayed and viewed on a display device without being further processed, and the number of positive going pulses per set of scan lines defines content control information controlling subsequent use thereof and indicating a selected one of a set of at least three predetermined commands; and
an output port adapted to output the modified video signal.

40. Apparatus to provide a copy protected video signal, comprising:
a reader having an input port adapted to receive an analog video signal including at least one positive going pulse in a back porch region of a plurality of horizontal blanking intervals and which reads the number of positive going pulses per set of scan lines as indicating a selected one of a set of at least three predetermined commands; and
a compliant device coupled to an output port of the reader and which, responsive to the indication of the command from the reader, outputs an analog video signal including an extra signal or a signal modification providing copy control or copy protection, and wherein the output analog video signal is viewable without being further processed.

41. The apparatus of claim 40, wherein the apparatus reads the at least one positive going pulse in at least one of luma or chroma channels of the received analog video signal.

42. The apparatus of claim 40, wherein the compliant device is one of a video recorder or transmitter.

43. The apparatus of claim 40, wherein the received analog video signal is a high definition video signal.

44. The apparatus of claim 40, wherein the reader reads back porch pulses (BPP), automatic gain control (AGC) pulses, or pseudo-sync (PS) pulses.

45. A method of modifying a video signal to control use of the video signal, comprising the acts of:
receiving a video signal generally conforming to a digital television standard; and
modifying a portion of the video signal associated with at least one tri-level synchronization pulse in a horizontal blanking interval in selected scan lines of the video signal by adding at least one positive going pulse to a front or back porch of the horizontal blanking interval, whereby the modified video signal is readily displayed and viewed on a display device without being further processed, and a pattern of the added positive going pulses per set of scan lines defines content control information controlling subsequent use of the video signal and indicating a selected one of a set of at least three commands.

46. A method to control use of a video signal comprising the acts of:
receiving a video signal generally conforming to a digital television standard and having tri-level synchronization pulses associated with horizontal blanking intervals of scan lines of the video signal and being readily displayed and viewed on a display device without being further processed, a portion of the video signal associated with at least one tri-level synchronization pulse being modified by having at least one positive going pulse added to a front or back porch of the horizontal blanking interval;
wherein a pattern of the added positive going pulses per set of lines at least in part defines a predetermined command selected from one of a set of at least three predetermined commands; and
controlling subsequent use of the video signal in accordance with the command.

47. Apparatus for modifying a video signal, comprising:
an input port adapted for receiving a video signal generally conforming to a digital television standard;
a processor coupled to the input port and modifying a portion of the video signal associated with at least one tri-level synchronization pulse in a horizontal blanking interval in selected scan lines of the video signal by adding at least one positive going pulse to a front or back porch of the horizontal blanking interval, whereby the modified video signal is readily displayed and viewed on a display device without being further processed, and a pattern of the added positive going pulses per set of scan lines defines content control information controlling subsequent use thereof and indicating a selected one of a set of at least three predetermined commands; and
an output port adapted to output the modified video signal.

48. Apparatus to provide a copy protected video signal, comprising:
- a reader having an input port adapted to receive an analog video signal including at least one positive going pulse in a back porch region of a plurality of horizontal blanking intervals and which reads a pattern of the positive going pulses per set of scan lines as indicating a selected one of a set of at least three predetermined commands; and
- a compliant device coupled to an output port of the reader and which, responsive to the indication of the command from the reader, outputs an analog video signal including an extra signal or a signal modification providing copy control or copy protection, and wherein the output analog video signal is viewable without being further processed.

49. A method of modifying a video signal to control use of the video signal, comprising the acts of:
- receiving a video signal generally conforming to a digital television standard; and
- modifying a portion of the video signal associated with at least one synchronization pulse in a horizontal blanking interval in selected scan lines of the video signal by adding at least one positive going pulse to a front or back porch of the horizontal blanking interval, whereby the modified video signal is readily displayed and viewed on a display device without being further processed, and a pattern and a number of the added positive going pulses per set of scan lines defines content control information controlling subsequent use of the video signal and indicating a selected one of a set of at least three commands.

50. A method to control use of a video signal comprising the acts of:
- receiving a video signal generally conforming to a digital television standard and having synchronization pulses associated with horizontal blanking intervals of scan lines of the video signal and being readily displayed and viewed on a display device without being further processed, a portion of the video signal associated with at least one synchronization pulse being modified by having at least one positive going pulse added to a front or back porch of the horizontal blanking interval;
- wherein a pattern and a number of the added positive going pulses per set of scan lines at least in part defines a predetermined command selected from one of a set of at least three predetermined commands; and
- controlling subsequent use of the video signal in accordance with the command.

51. Apparatus for modifying a video signal, comprising:
- an input port adapted for receiving a video signal generally conforming to a digital television standard;
- a processor coupled to the input port and modifying a portion of the video signal associated with at least one synchronization pulse in a horizontal blanking interval in selected scan lines of the video signal by adding at least one positive going pulse to a front or back porch of the horizontal blanking interval, whereby the modified video signal is readily displayed and viewed on a display device without being further processed, and a pattern and a number of the added positive going pulses per set of scan lines defines content control information controlling subsequent use thereof and indicating a selected one of a set of at least three predetermined commands; and
- an output port adapted to output the modified video signal.

52. Apparatus to provide a copy protected video signal, comprising:
- a reader having an input port adapted to receive an analog video signal including at least one positive going pulse in a back porch region of a plurality of horizontal blanking intervals and which reads a pattern and a number of the positive going pulses per set of scan lines as indicating a selected one of a set of at least three predetermined commands; and
- a compliant device coupled to an output port of the reader and which, responsive to the indication of the command from the reader, outputs an analog video signal including an extra signal or a signal modification providing copy control or copy protection, and wherein the output analog video signal is viewable without being further processed.

53. The apparatus of claim 52, wherein the extra signal is provided to the luma or chroma channel of the copy protected video signal.

* * * * *